US012739423B2

(12) United States Patent
Liao et al.

(10) Patent No.: US 12,739,423 B2
(45) Date of Patent: Sep. 15, 2026

(54) SUBBLOCK-BASED TEMPORAL MOTION VECTOR PREDICTION

(71) Applicant: Alibaba (China) Co., Ltd., Hangzhou (CN)

(72) Inventors: Ru-ling Liao, Sunnyvale, CA (US); Yan Ye, San Diego, CA (US); Jie Chen, Beijing (CN); Xinwei Li, Beijing (CN); Yeping Zheng, Beijing (CN)

(73) Assignee: Alibaba (China) Co., Ltd., Zhejiang (CN)

( * ) Notice: Subject to any disclaimer, the term of this patent is extended or adjusted under 35 U.S.C. 154(b) by 0 days.

(21) Appl. No.: 18/894,929

(22) Filed: Sep. 24, 2024

(65) Prior Publication Data

US 2025/0113050 A1 Apr. 3, 2025

Related U.S. Application Data

(60) Provisional application No. 63/618,388, filed on Jan. 8, 2024, provisional application No. 63/587,506, filed on Oct. 3, 2023.

(51) Int. Cl.

| | |
|---|---|
| ***H04N 19/52*** | (2014.01) |
| ***H04N 19/105*** | (2014.01) |
| ***H04N 19/119*** | (2014.01) |
| ***H04N 19/172*** | (2014.01) |
| ***H04N 19/176*** | (2014.01) |
| ***H04N 19/70*** | (2014.01) |

(52) U.S. Cl.

CPC ........... *H04N 19/52* (2014.11); *H04N 19/105* (2014.11); *H04N 19/119* (2014.11); *H04N 19/172* (2014.11); *H04N 19/176* (2014.11); *H04N 19/70* (2014.11)

(58) Field of Classification Search

CPC ........................................................ H04N 19/52
USPC ......................................... 375/240.01–240.9
See application file for complete search history.

(56) References Cited

U.S. PATENT DOCUMENTS 11,012,687 B2 * 5/2021 Li ........................ H04N 19/176
11,166,015 B2 * 11/2021 Li .......................... H04N 19/70
(Continued)

FOREIGN PATENT DOCUMENTS

WO 2023109899 A1 6/2023

OTHER PUBLICATIONS

"Requirements for a Future Video Coding Standard v5," International Organisation for Standardisation, Torino, IT, 14 pages (2017).
(Continued)

*Primary Examiner* — Leron Beck
(74) *Attorney, Agent, or Firm* — FINNEGAN, HENDERSON, FARABOW, GARRETT & DUNNER LLP

(57) ABSTRACT

Methods and apparatuses are provided for subblock-based temporal motion vector prediction (SbTMVP). An exemplary decoding method includes: decoding a target coding unit (CU) based on a SbTMVP mode, wherein the target CU is divided into a plurality of subblocks; determining a same reference picture index for the plurality of subblocks; selecting, based on the determined reference picture index, a reference picture from a list of reference pictures; generating a plurality of predicted subblocks based on the selected reference picture; and reconstructing the target CU based on the plurality of predicted subblocks.

19 Claims, 24 Drawing Sheets

(56) References Cited

U.S. PATENT DOCUMENTS

| | | | | |
|---|---|---|---|---|
| 2018/0084260 | A1 | 3/2018 | Chien et al. | |
| 2018/0098063 | A1* | 4/2018 | Chen | H04N 19/139 |
| 2021/0120242 | A1* | 4/2021 | Nam | H04N 19/122 |
| 2022/0060718 | A1* | 2/2022 | Zhang | H04N 19/70 |
| 2022/0070442 | A1* | 3/2022 | Jang | H04N 19/132 |
| 2022/0239899 | A1* | 7/2022 | Zhang | H04N 19/46 |
| 2022/0303571 | A1 | 9/2022 | Zhang et al. | |
| 2022/0417500 | A1* | 12/2022 | Huang | H04N 19/503 |
| 2023/0104476 | A1* | 4/2023 | Chen | H04N 19/52 375/240.02 |
| 2025/0133227 | A1* | 4/2025 | Yang | H04N 19/44 |

OTHER PUBLICATIONS

Chang et al., "Compression efficiency methods beyond VVC," JVET-U0100, 21$^{st}$ Meeting, by teleconference, Jan. 6-15, 2021, 13 pages.

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

Chen et al., "Algorithm description for Versatile Video Coding and Test Model 11 (VTM 11)," JVET-T2002-v1, 20$^{th}$ meeting by teleconference, Oct. 7-16, 2020, 104 pages.

Coban et al., "Algorithm description of Enhanced Compression Model 10 (ECM 10)" JVET-AE2025, 31 $^{st}$ Meeting, Geneva, CH, Jul. 11-19, 2023, 83 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Jem, https://jvet hhl.fraunhofer.de/svn/svn_HMJEMSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

Chen et al., "EE2-2.3: SbTMVP with MMVD," JVET-AD0209-v2, 30th Meeting, Antalya, TR, Apr. 21-28, 2023, 4 pages.

Liao et al., "EE2-2.2: AMVP with SbTMVP mode," JVET-AD0152-v3, 30th Meeting, Antalya, TR, Apr. 21-28, 2023, 4 pages.

PCT International Search Report and Written Opinion mailed Dec. 6, 2024, issued in corresponding International Application No. PCT/CN2024/123068 (7 pgs.).

* cited by examiner

FIG. 20
current picture
Mv1
Mv3
Mv0
Mv2
Mv1
reference picture of Mv1

SUBBLOCK-BASED TEMPORAL MOTION VECTOR PREDICTION

The disclosure claims the benefits of priority to: U.S. Provisional Application No. 63/587,506, filed on Oct. 3, 2023, and U.S. Provisional Application No. 63/618,388, filed on Jan. 8, 2024. All of the claimed provisional applications are incorporated herein by reference in their entireties.

TECHNICAL FIELD

Technical Field

The present disclosure generally relates to video processing, and more particularly, to methods and apparatuses for subblock-based temporal motion vector prediction.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods and apparatuses for subblock-based temporal motion vector prediction.

According to some exemplary embodiments, there is provided a computer-implemented method of decoding a bitstream associated with a video sequence. The method includes: decoding a target coding unit (CU) based on a subblock-based temporal motion vector prediction (SbTMVP) mode, wherein the target CU is divided into a plurality of subblocks; determining a same reference picture index for the plurality of subblocks; selecting, based on the determined reference picture index, a reference picture from a list of reference pictures; generating a plurality of predicted subblocks based on the selected reference picture; and reconstructing the target CU based on the plurality of predicted subblocks.

According to some exemplary embodiments, there is provided a computer-implemented method of encoding a video sequence. The method includes: dividing a target coding unit (CU) into a plurality of subblocks; and encoding the plurality of subblocks based on a subblock-based temporal motion vector prediction (SbTMVP) mode, wherein the encoding includes: determining a same reference picture index for the plurality of subblocks; selecting, based on the determined reference picture index, a reference picture from a list of reference pictures; and generating a plurality of predicted subblocks based on the selected reference picture.

According to some exemplary embodiments, there is provided a non-transitory computer readable storage medium storing a bitstream of a video. The bitstream includes: syntax elements for coding a target coding unit (CU) in a subblock-based temporal motion vector prediction (SbTMVP) mode, the target CU being divided into a plurality of subblocks. The syntax elements, when decoded by a processor, cause the processor to process the bitstream according to: determining a same reference picture index for the plurality of subblocks; selecting, based on the determined reference picture index, a reference picture from a list of reference pictures; generating a plurality of predicted subblocks based on the selected reference picture; and reconstructing the target CU based on the plurality of predicted subblocks.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
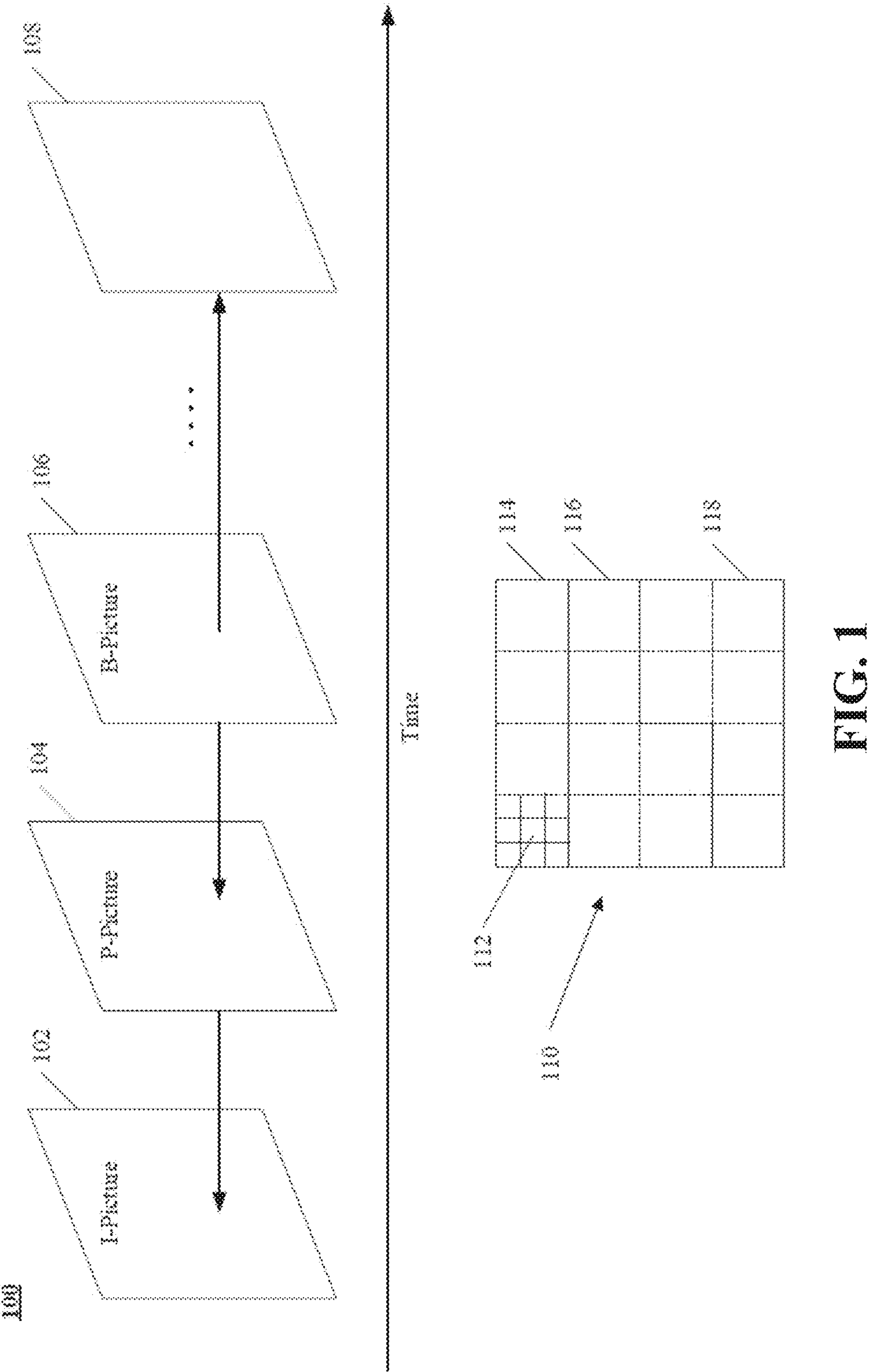
FIG. 1 illustrates structures of an exemplary video sequence, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Video coding systems are often used to compress digital video signals, for instance to reduce storage space consumed or to reduce transmission bandwidth consumption associated with such signals. With high-definition (HD) videos (e.g., having a resolution of 1920×1080 pixels) gaining popularity in various applications of video compression, such as online video streaming, video conferencing, or video monitoring, it is a continuous need to develop video coding tools that can increase compression efficiency of video data.

For example, video monitoring applications are increasingly and extensively used in many application scenarios (e.g., security, traffic, environment monitoring, or the like), and the numbers and resolutions of the monitoring devices keep growing rapidly. Many video monitoring application scenarios prefer to provide HD videos to users to capture more information, which has more pixels per frame to capture such information. However, an HD video bitstream can have a high bitrate that demands high bandwidth for transmission and large space for storage. For example, a monitoring video stream having an average 1920×1080 resolution can require a bandwidth as high as 4 Mbps for real-time transmission. Also, the video monitoring generally monitors 7×24 continuously, which can greatly challenge a storage system, if the video data is to be stored. The demand for high bandwidth and large storage of the HD videos has therefore become a major limitation to its large-scale deployment in video monitoring.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for monitoring, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture."

A picture coded using a previous picture as a reference picture is referred to as a "P-picture." A picture coded using both a previous picture and a future picture as reference pictures (i.e., the reference is "bi-directional") is referred to as a "B-picture."

As previously mentioned, video monitoring that uses HD videos faces challenges of demands of high bandwidth and large storage. For addressing such challenges, the bitrate of the encoded video can be reduced. Among the I-, P-, and B-pictures, I-pictures have the highest bitrate. Because the backgrounds of most monitoring videos are nearly static, one way to reduce the overall bitrate of the encoded video can be using fewer I-pictures for video encoding.

However, the improvement of using fewer I-pictures can be trivial because the I-pictures are typically not dominant in the encoded video. For example, in a typical video bitstream, the ratio of I-, B-, and P-pictures can be 1:20:9, in which the I-pictures can account for less than 10% of the total bitrate. In other words, in such an example, even all I-pictures are removed, the reduced bitrate can be no more than 10%.

FIG. 1 illustrates structures of an example video sequence 100, consistent with embodiments of the disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
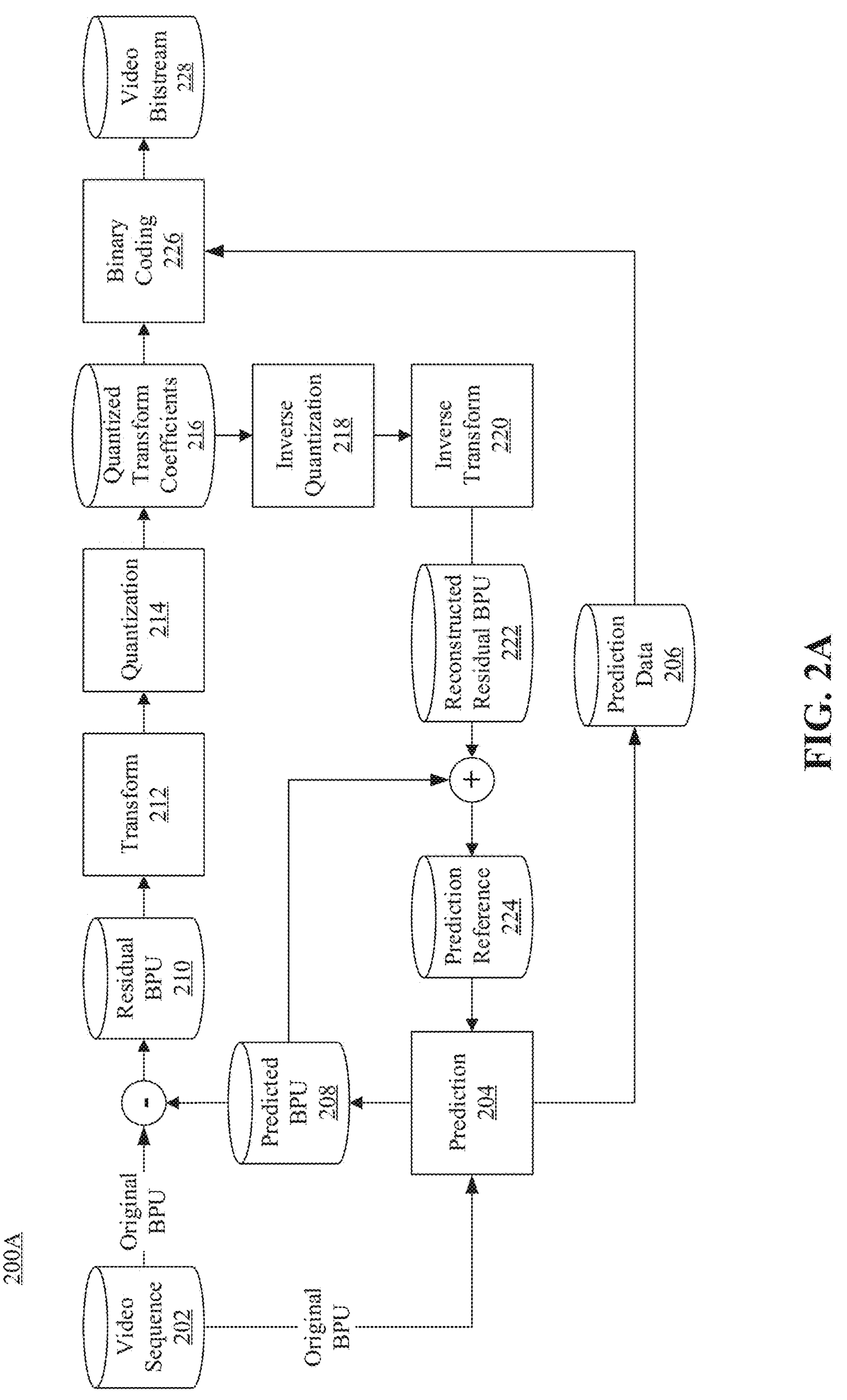
FIG. 2A illustrates a schematic diagram of an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
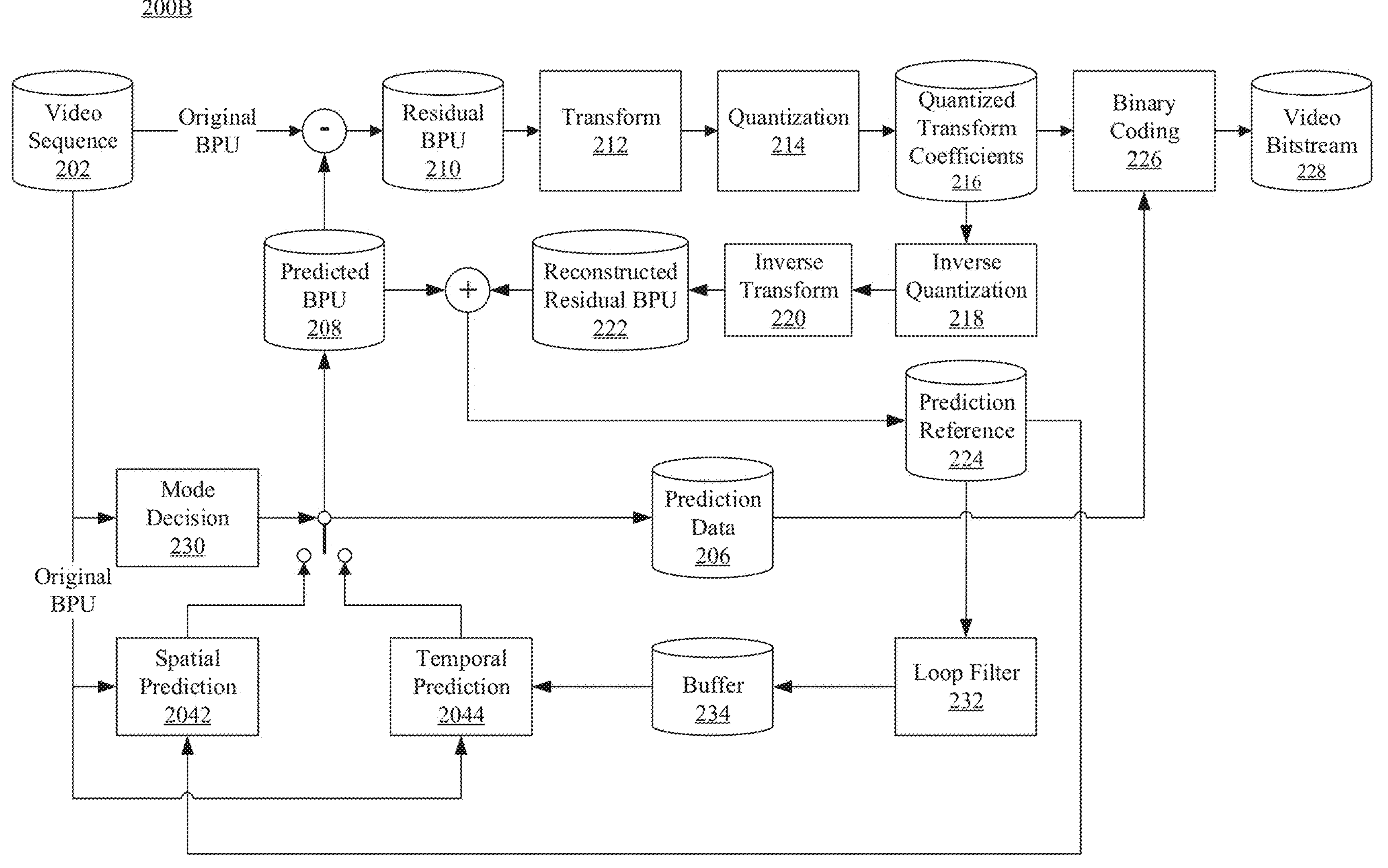
FIG. 2B illustrates a schematic diagram of another example encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
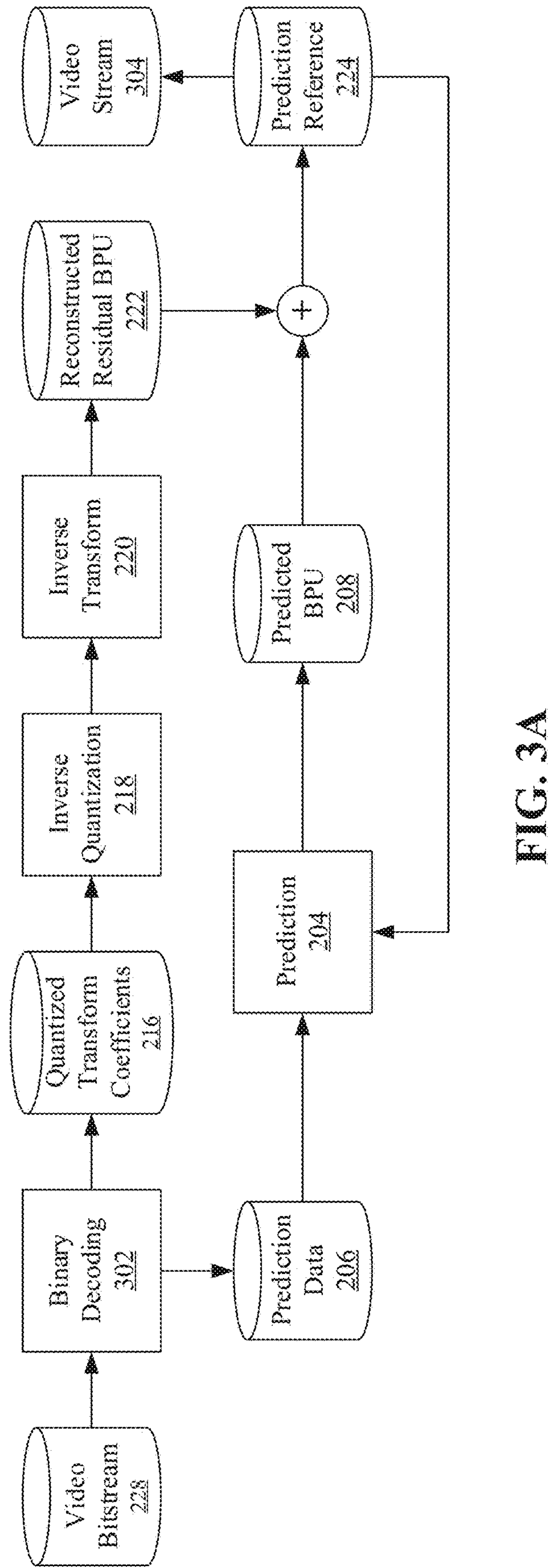
FIG. 3A illustrates a schematic diagram of an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
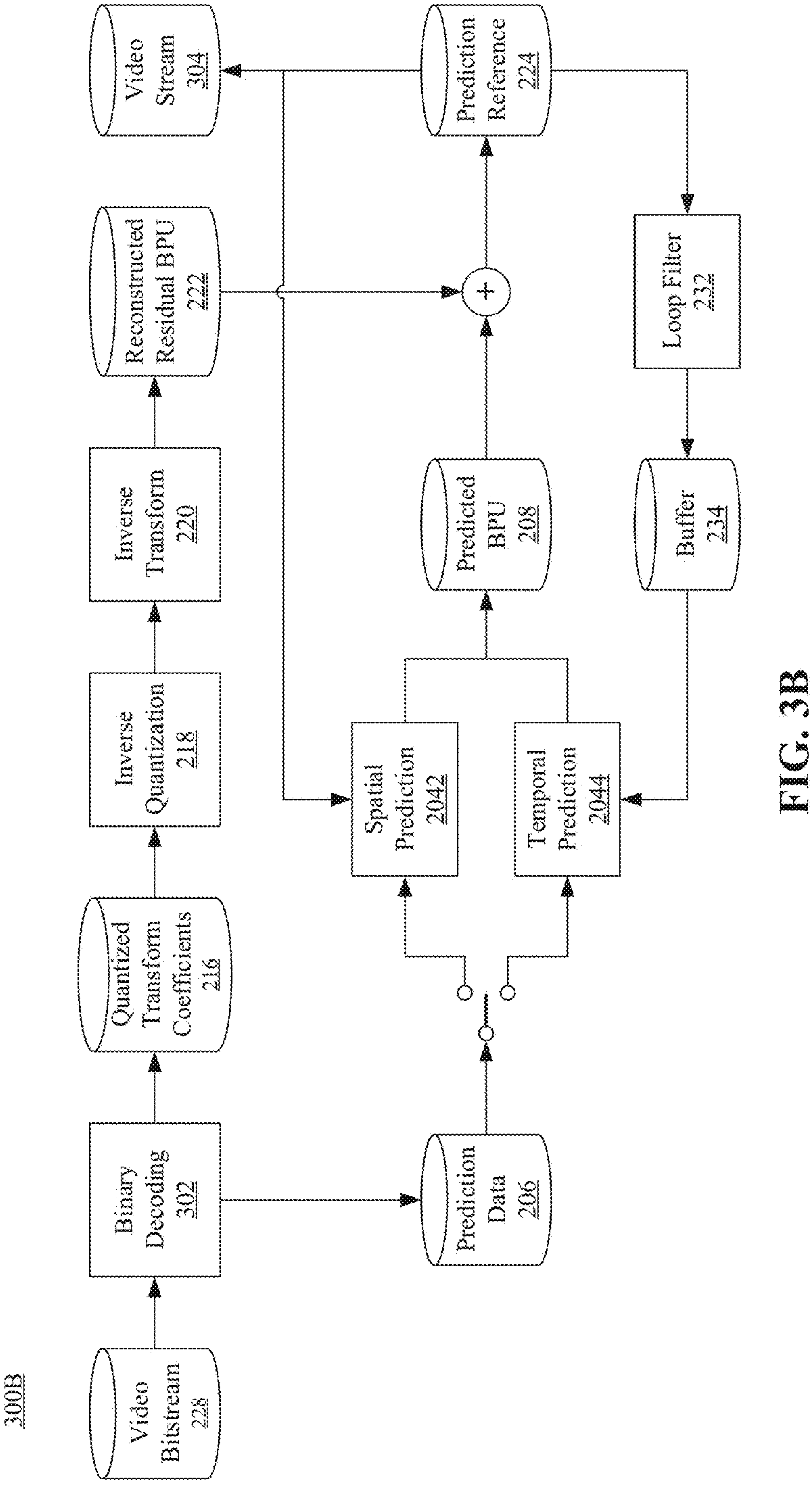
FIG. 3B illustrates a schematic diagram of another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
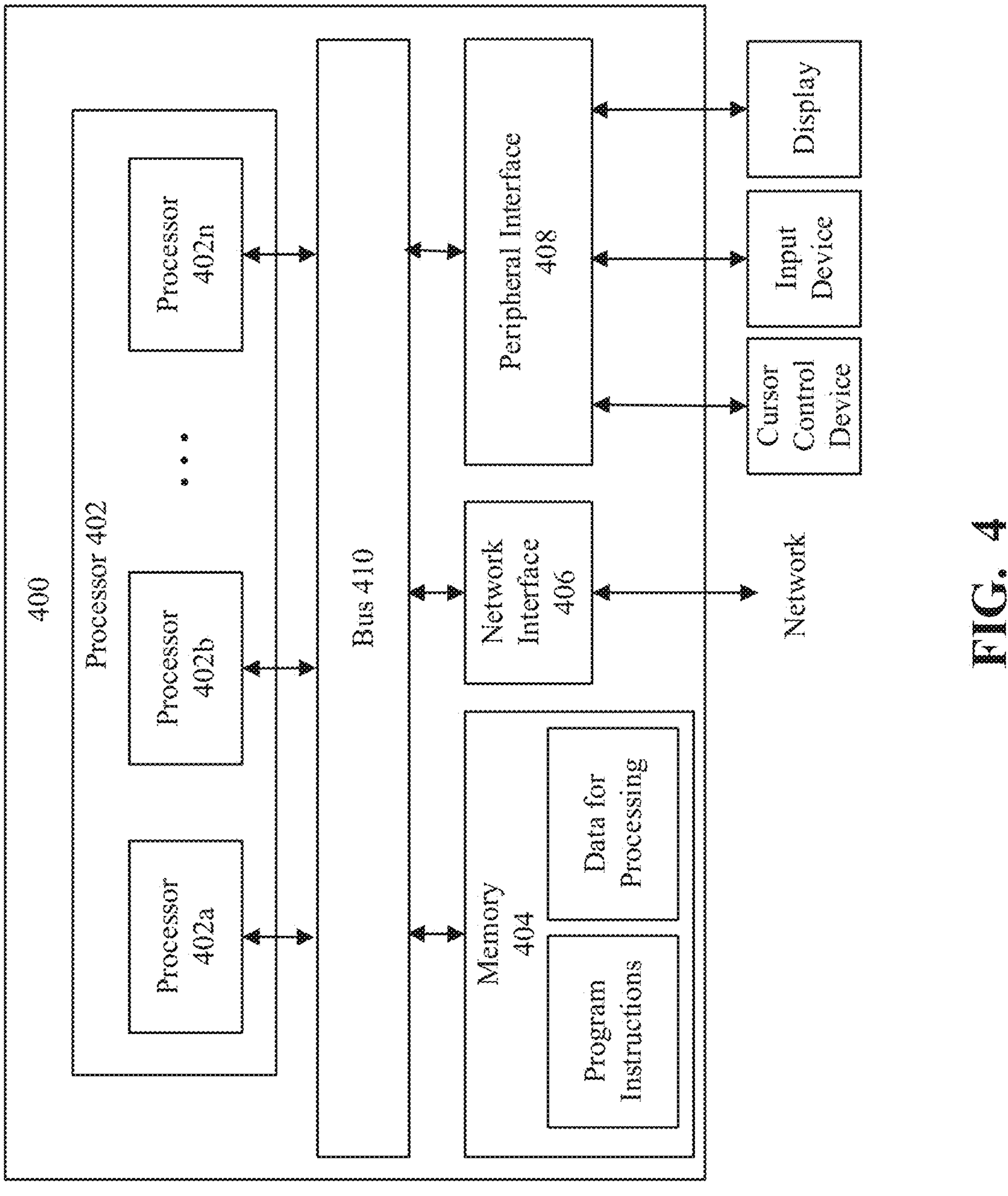
FIG. 4 is a block diagram of an exemplary apparatus for encoding or decoding a video, consistent with embodiments of the disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
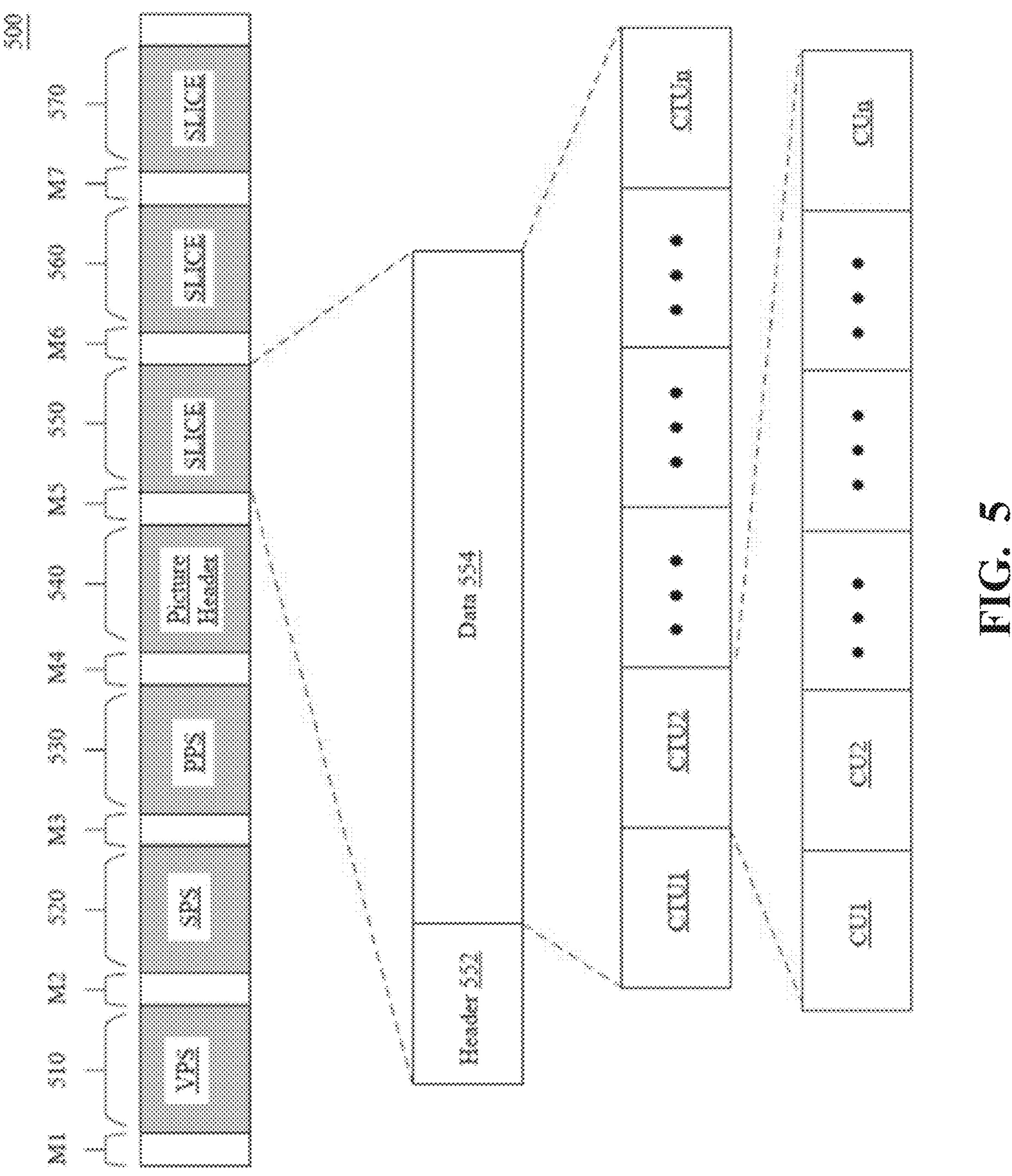
FIG. 5 is a schematic diagram illustrating a bitstream structure, according to some embodiments of the present disclosure

FIG. 5 is a schematic diagram illustrating a bitstream structure, according to some embodiments of the present disclosure. In some embodiments, the structure of bitstream 500 can be applied for video bitstream 162 shown in FIG. 1. In FIG. 5, bitstream 500 includes a Video Parameter Set (VPS) 510, a Sequence Parameter Set (SPS) 520, a Picture Parameter Set (PPS) 530, a Picture Header 540, Slices 550-570, which are separated by synchronization markers M1-M7. Slices 550-570 each include corresponding header blocks (e.g., header 552) and data blocks (e.g., data 554), each data block including one or more CTUs (e.g., CTU1-CTUn in data 554). Moreover, each CTU further includes a plurality of CUs (e.g., CU1-CUn in FIG. 5).

According to some embodiments, bitstream 500, which is a sequence of bits in form of network abstraction layer (NAL) unit or byte stream, forms one or more coded video sequences (CVS). A CVS includes one or more coded layer video sequences (CLVS). In some embodiments, a CLVS is a sequence of picture units (PUs) and each PU contains one coded picture. Particularly, a PU includes zero or one picture header NAL unit (e.g., Picture Header 540) which contains picture header syntax structure as payload, one coded picture which includes one or more video coding layer (VCL) NAL units. Optionally, one or more other non-VCL NAL units. A VCL NAL unit is a collective term for coded slice NAL units (e.g., Slices 550-570) and the subset of NAL units that have reserved values of NAL unit type that are classified as VCL NAL units in some embodiments. A coded slice NAL unit contains a slice header and a slice data block (e.g., header 552 and data 554).

In some embodiments of the present disclosure, a layer can be a set of video coding layer (VCL) NAL units having a particular value of NAL layer ID and associated non-VCL NAL unit(s). Among these layers, inter-layer prediction may be applied between different layers to achieve high compression performance.

As explained above, in the Versatile Video Coding (e.g., VVC/H.266) standard, a picture can be partitioned into a set of CTUs, each of which is further partitioned into coding units (CUs) using quad-tree, binary tree, or ternary tree. Multiple CTUs can form a tile, a slice, or a subpicture. When a picture includes three sample arrays for storing three color components (e.g., a luma component and two chroma components), a CTU can include N×N (N being an integer) blocks of luma samples, each block of luma sample being associated with two blocks of chroma samples. In some embodiments, an Output Layer Set (OLS) can be specified to support decoding some but not all the layers. The OLS is a set of layers including a specified set of layers where one or more layers in the set of layers are specified to be output layers. Therefore, an OLS can contain one or more output layers and other layers needed to decode the output layer(s) for inter-layer prediction.

An Enhanced Compression Model (ECM) has been proposed and been used as a new software base for developing tools beyond the VVC standard.

Figure 6:
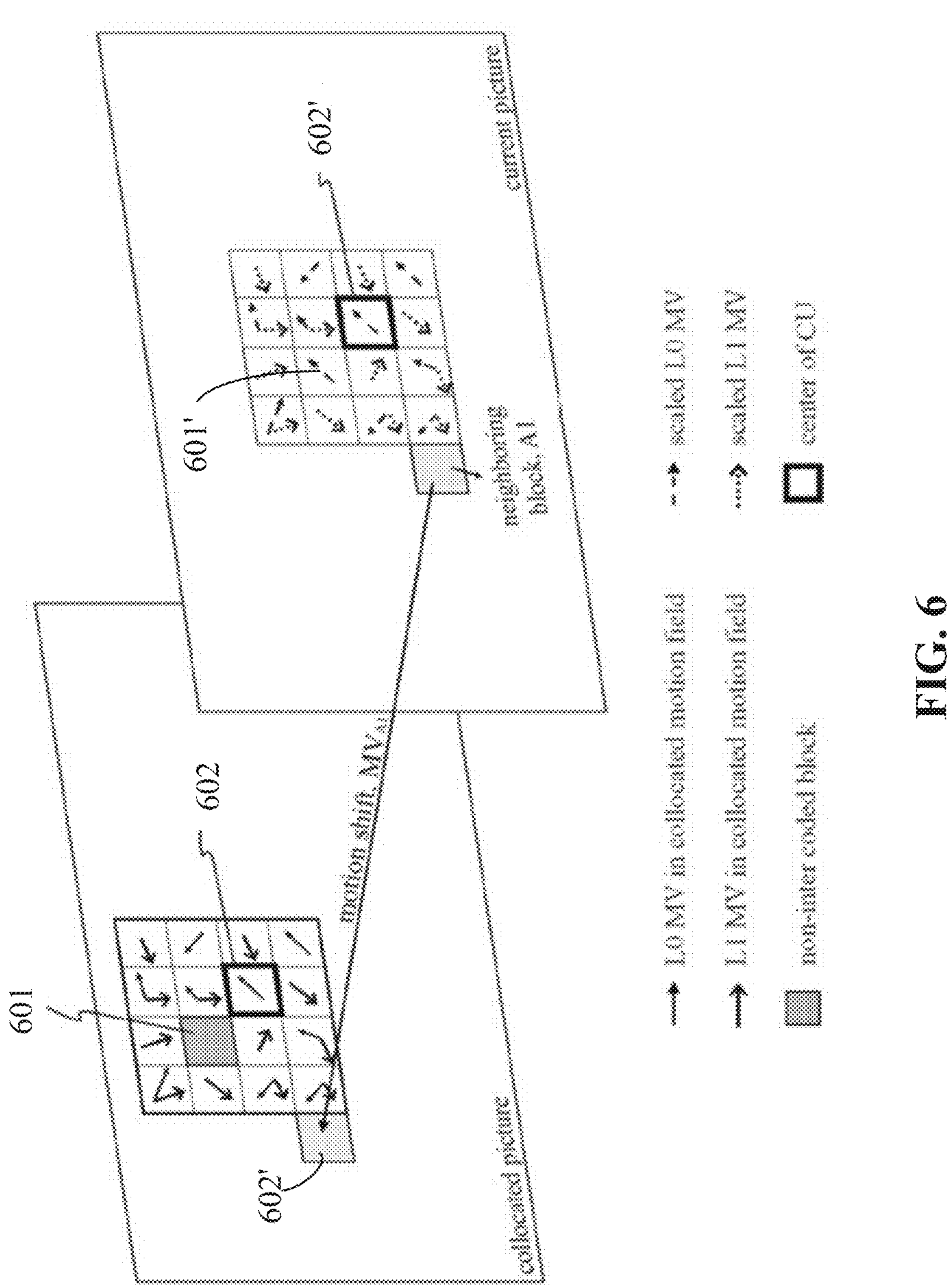
FIG. 6 is a schematic diagram illustrating an exemplary process for deriving motion vectors for subblocks in a subblock-based temporal motion vector prediction (SbTMVP) mode, according to some embodiments of the present disclosure.

In ECM, a mode called subblock-based temporal motion vector prediction (SbTMVP) is supported. In the SbTMVP mode, a CU is split into 4×4 subblocks and each subblock obtains its own motion vector from the motion field in the collocated picture. When obtaining motion vector for each subblock, a motion shift that is derived using the motion vector of the bottom-left neighboring blocks of the CU is applied. FIG. 6 is a schematic diagram illustrating an exemplary process for deriving motion vectors for subblocks in a subblock-based temporal motion vector prediction (SbTMVP) mode, according to some embodiments of the present disclosure. As shown in FIG. 6, a motion shift $MV_{A1}$ is obtained from neighboring block A1 of the CU in a current picture, and is used to derive a motion field in the collocated picture. For each subblock, the motion information of its corresponding subblock in the collocated picture is used to derive the motion information of the subblock in the current picture. After the motion information of a collocated subblock 602 is identified, it is converted to the motion vectors and reference indices of the current subblock 602'. The reference index of the subblock is selected from any one of reference pictures in a reference picture list. The selected reference picture is the one whose scaling factor is the closest to 1. A temporal motion scaling is applied after the reference index is identified. It is noted that when the corresponding subblock in the collocated picture is non-inter coded such as intra coded or intra block copy (IBC) coded, the motion information of the center subblock of the CU is used. As shown in FIG. 6, a corresponding subblock 601 is non-inter coded, that is, the subblock 601 does not contain any motion information. Thus, the motion information of the center subblock 602 is used. As a result, the motion information of a subblock 601' in the current picture corresponding to the subblock 601 is set as the same as the motion information of subblock 602' that corresponds to subblock 602 in the collocated picture.

To further improve coding efficiency of SbTMVP, two collocated pictures are utilized which are the two reference pictures with the least POC distance relative to the current picture. Moreover, instead of only using the motion vector of left neighboring block as motion shift, multiple locations are included and are adaptively determined according to template matching (TM) cost. Specifically, two motion shift candidate lists are constructed for the two collocated pictures. The TM cost are calculated to reorder the two motion shift candidate list. Then, the SbTMVP candidates with smaller TM cost in the two motion shift candidate list are included in a subblock-based merge list.

When constructing the subblock-based merge list, the SbTMVP candidates are firstly added followed by affine merge candidates. Then, adaptive reordering of merge candidates with template matching (ARMC) is applied to sort the candidates in the subblock-based merge list. In the ECM-10.0, at most 4 SbTMVP candidates are included in the subblock-based merge list. The SbTMVP candidates are derived and are added to the subblock-based merge list using the following steps:

the SbTMVP candidate derived from the first candidate in the first motion shift candidate list is placed in the first entry;

if current picture is a non-low delay picture and the two collocated pictures are different from each other, the SbTMVP candidate derived from the first candidate in the second motion shift candidate list is added;

the SbTMVP candidates derived from the second and third candidates in the first motion shift candidate list are added.

The first SbTMVP candidate is placed in the first entry without reordering, while other SbTMVP candidates are sorted together with other affine candidates. The number of candidates in the subblock-based merge list is set to 30 before ARMC, and is set to 15 after ARMC.

Figure 7:
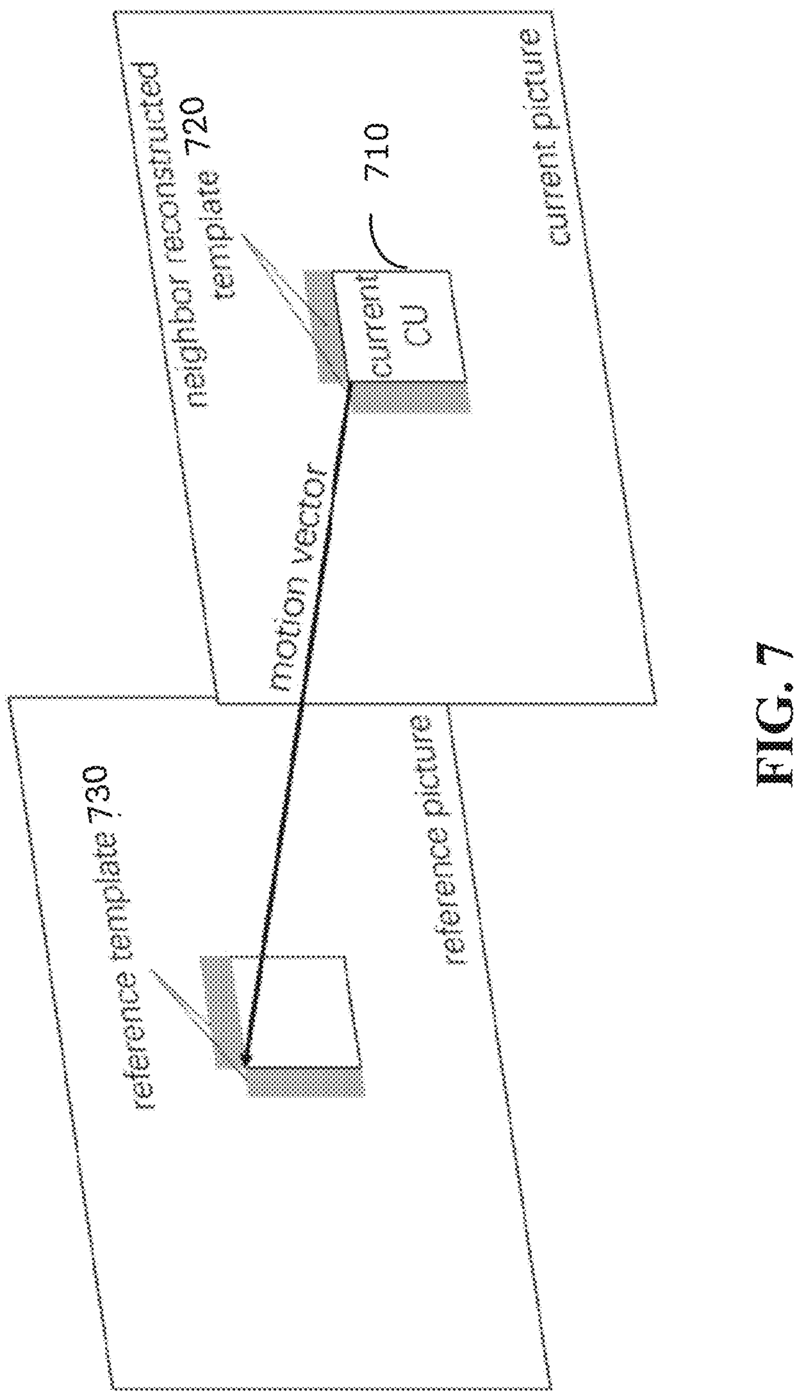
FIG. 7 illustrates an exemplary local illumination compensation (LIC) process, according to some embodiments of the present disclosure.

According to some embodiments, the SbTMVP mode can be combined with local illumination compensation (LIC). LIC is adopted in ECM to adjust the illumination changes between a reference picture and a current picture. The prediction samples of a LIC coded block are modified according to a linear equation, that is, $\alpha \times p[x]+\beta$, wherein $\alpha$ is a scale, $\beta$ is an offset and p[x] is the prediction sample. FIG. 7 illustrates an example process for derivation of $\alpha$ and $\beta$, according to some embodiments of the present disclosure. Referring to FIG. 7, the $\alpha$ and $\beta$ are derived using neighboring reconstructed template 720 of the current CU 710 and its corresponding reference template 730.

Figure 8:
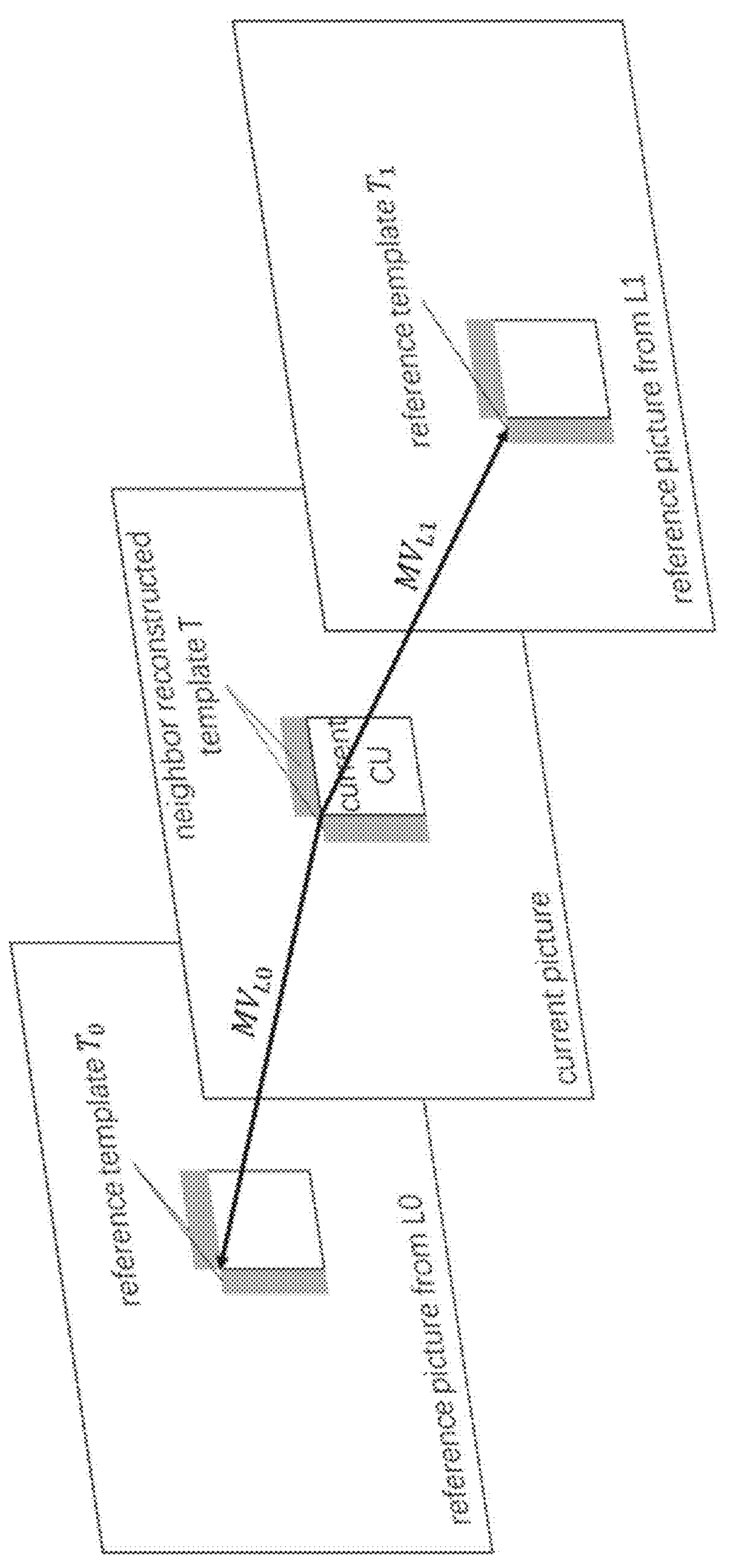
FIG. 8 illustrates an exemplary bi-predictive LIC process, according to some embodiments of the present disclosure.

For a uni-predictive block with LIC enabled, after performing motion compensation process, the LIC parameters are derived and applied to the predicted samples of the uni-predictive block. For a bi-predictive block with LIC enabled (as shown in FIG. 8), different sets of LIC parameters are derived for the L0 and L1 prediction samples, respectively. An iterative manner can be used to derive the L0 and L1 LIC parameters, as shown in FIG. 9.

Figure 9:
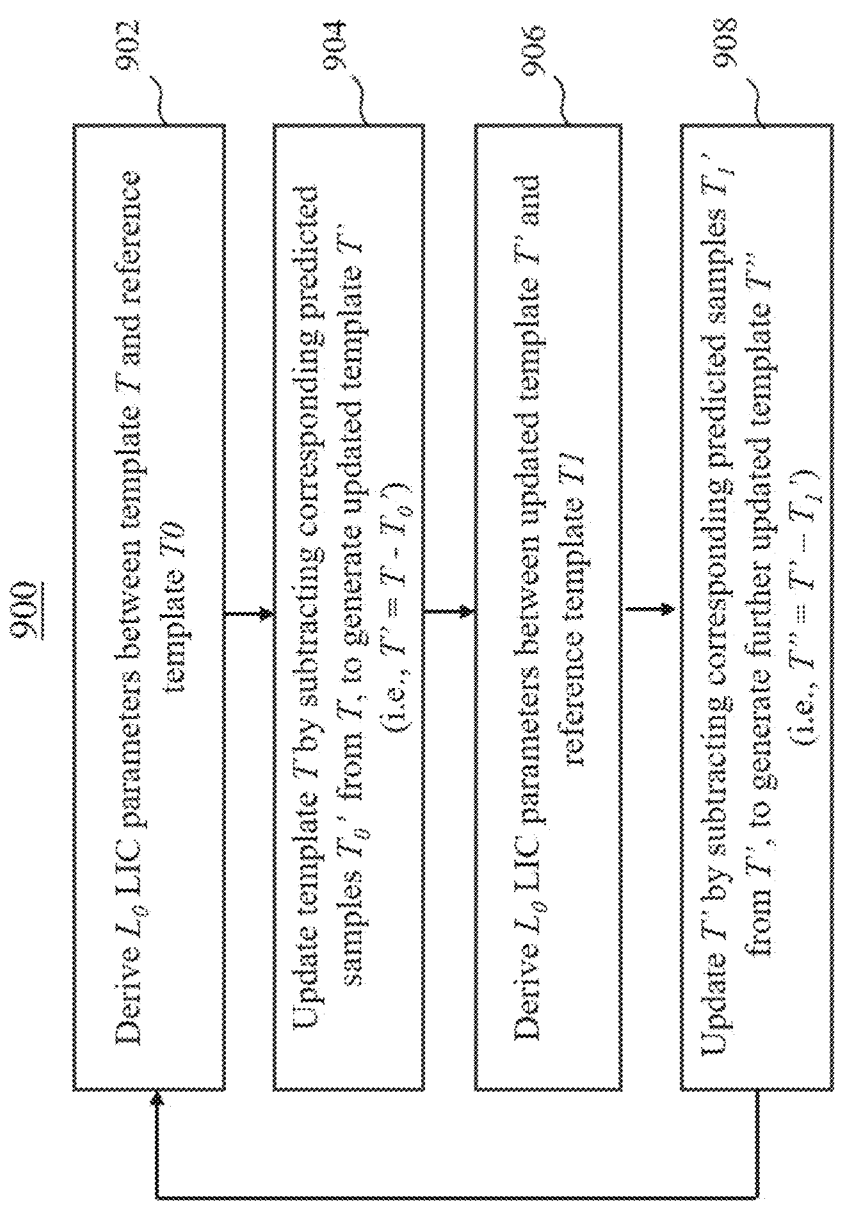
FIG. 9 is a flow chart showing an exemplary process for deriving L0 and L1 LIC parameters for a bi-predictive block, according to some embodiments of the present disclosure.

FIG. 9 is a flow chart showing an exemplary process 900 for deriving the L0 and L1 LIC parameters for a bi-predictive block, according to some embodiments of the present disclosure. Process 900 can be performed by an encoder (e.g., e.g., by process 200A of FIG. 2A or 200B of FIG. 2B), a decoder (e.g., by process 300A of FIG. 3A or 300B of FIG. 3B), or one or more software or hardware components of an apparatus (e.g., apparatus 400 of FIG. 4). For example, a processor (e.g., processor 402 of FIG. 4) can perform process 900. In some embodiments, process 900 can be implemented by a computer program product, embodied in a computer-readable medium, including computer-executable instructions, such as program code, executed by computers (e.g., apparatus 400 of FIG. 4). Referring to FIG. 9, process 900 may include the following steps 902 to 908.

In step 902, L0 LIC parameters are first derived. Referring to the bi-prediction example shown in FIG. 8, template T of the current CU can include an above neighbor block and a left neighbor block of the current CU. Template T has a corresponding reference template T0 in a reference picture from L0, and has a corresponding reference template T1 in a reference picture from L1. The L0 LIC parameters can be derived by minimizing the difference between template T and predicted reference template T0. The predicted reference template T0 that minimizes the difference is denoted as T0'.

Referring back to FIG. 9, in step 904, the samples in template T are updated by subtracting the corresponding samples in predicted reference template T0' from template T, to generate updated template T'. This process can be expressed as T'=T−T0'.

In step 906, L1 LIC parameters are derived by minimizing the difference between the updated template T' and predicted reference template T1. The predicted reference template T1 that minimizes the difference is denoted as T1'.

In step 908, the samples in updated template T' are updated by subtracting the corresponding samples in predicted reference template T1' from updated template T', to generate further updated template T". This process can be expressed as T"=T'−T1'.

After step 908, process 900 can return to step 902 to start a next iteration of deriving the L0 and L1 LIC parameters.

When the LIC is enabled at sequence level, for non-merge coded CU, a flag is signaled at CU level to indicate whether the CU is coded using the LIC mode. For the merge coded CU, the LIC flag is directly inherited from its corresponding merge candidates. It is also noted that the LIC mode is not applied to SbTMVP, GPM and AMVP-merge modes.

When overlapped block motion compensation (OBMC) mode is used in a LIC coded block, the LIC parameters are applied to generate the corresponding prediction samples for the OBMC of the LIC coded block. Besides, to reduce the complexity, the OBMC is only applied to the top and left CU boundaries while being always disabled for the boundaries of the internal sub-blocks of the LIC coded block.

In the current design, the reference picture index for each subblock in a SbTMVP coded block may be different from each other. This could cause prediction discontinuity and create high frequency signal between subblocks' boundaries, thereby reducing the coding efficiency of SbTMVP mode. In addition, the LIC mode cannot be applied to the SbTMVP mode in the current design.

The present disclosure provides solutions to one or more of the above-described problems associated with the SbTMVP mode.

Figure 10:
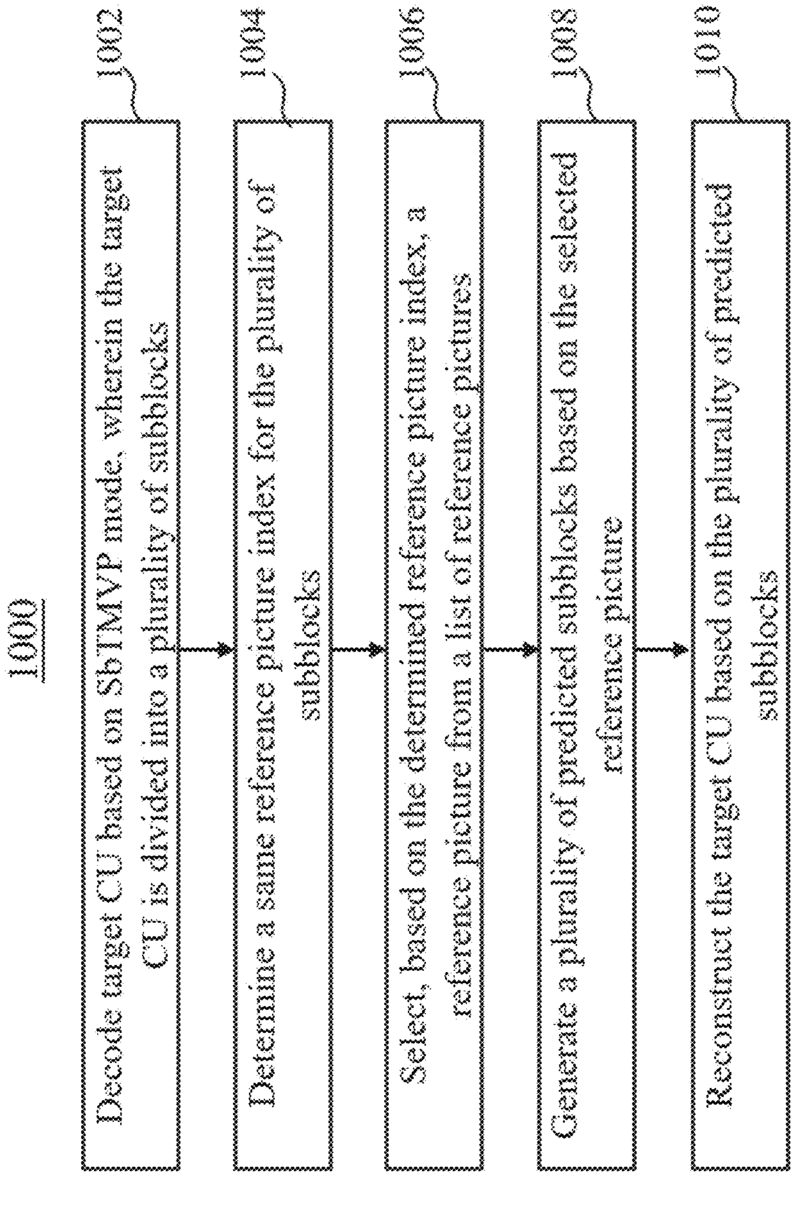
FIG. 10 is a flow chart showing an exemplary method for decoding a bitstream based on the SbTMVP mode, according to some embodiments of the present disclosure.

Particularly, the present disclosure provides methods for performing reference picture index selection of SbTMVP mode. FIG. 10 is a flow chart showing an exemplary method 1000 for decoding a bitstream in the SbTMVP mode, according to some embodiments of the present disclosure. Method 1000 can be performed by a decoder (e.g., by process 300A of FIG. 3A or 300B of FIG. 3B), or performed by one or more software or hardware components of an apparatus (e.g., apparatus 400 of FIG. 4). For example, a processor (e.g., processor 402 of FIG. 4) can perform method 1000. In some embodiments, method 1000 can be implemented by a computer program product, embodied in a computer-readable medium, including computer-executable instructions, such as program code, executed by computers (e.g., apparatus 400 of FIG. 4). Referring to FIG. 10, method 1000 may include the following steps 1002 to 1010.

In step 1002, a target CU is decoded according to the SbTMVP mode. According to the SbTMVP mode, the target CU is divided into a plurality of subblocks. Specifically, the decoding of the target CU involves decoding a bitstream associated with a video sequence. The bitstreams includes coded syntax elements for the SbTMVP mode. The coded syntax elements may include coded flags (e.g., sequence level flags) indicating the SbTMVP mode is enabled for the video sequence. The coded syntax elements may also include coded parameters that can be used for decoding the target CU based on the SbTMVP mode.

In step 1004, a same reference picture index is determined for the plurality of subblocks. According to the disclosed embodiments, the reference picture indices used for predicting the plurality of subblocks are set to be the same value.

In step 1006, a reference picture is selected from a list of reference pictures based on the determined reference picture index.

In step 1008, a plurality of predicted subblocks is generated based on the selected reference picture.

In step 1010, the target CU is reconstructed based on the plurality of predicted subblocks. The reconstructed CU can be used to decode a next CU or a next picture in the video sequence, as described in process 300A of FIG. 3A or 300B of FIG. 3B.

In some embodiments, two lists of reference pictures, L0 and L1, may be used for predicting the plurality subblocks. In these embodiments, the reference picture index determined in step 1004 includes a first index associated with the L0 list and a second index associated with the L1 list. Also, the reference picture selected in step 1006 includes a first reference picture selected from the L0 list based on the first index, and a second reference picture selected from the L1 list based on the second index. And, in step 1008, the plurality of predicted subblocks is generated based on the first and second reference pictures.

The details for step 1004 (determining a same reference picture index) in FIG. 10 are further explained below.

In some embodiments, the reference picture indices of all subblocks in a SbTMVP coded block can be set to a value N, where N is an integer and is larger than or equal to 0. For example, the value N can be set equal to 0. In this case, all the subblocks uses the same reference picture. It is noted that the value N may be a pre-defined value without signaling in the bitstream. The value N can also be signaled in a sequence parameter set (SPS), a picture parameter set (PPS), a picture header, or a slice header. Additionally, since there are two reference picture list L0 and L1 in ECM design, the reference picture index of L0 and L1 for subblocks may be the same or different from each other.

Figure 11:
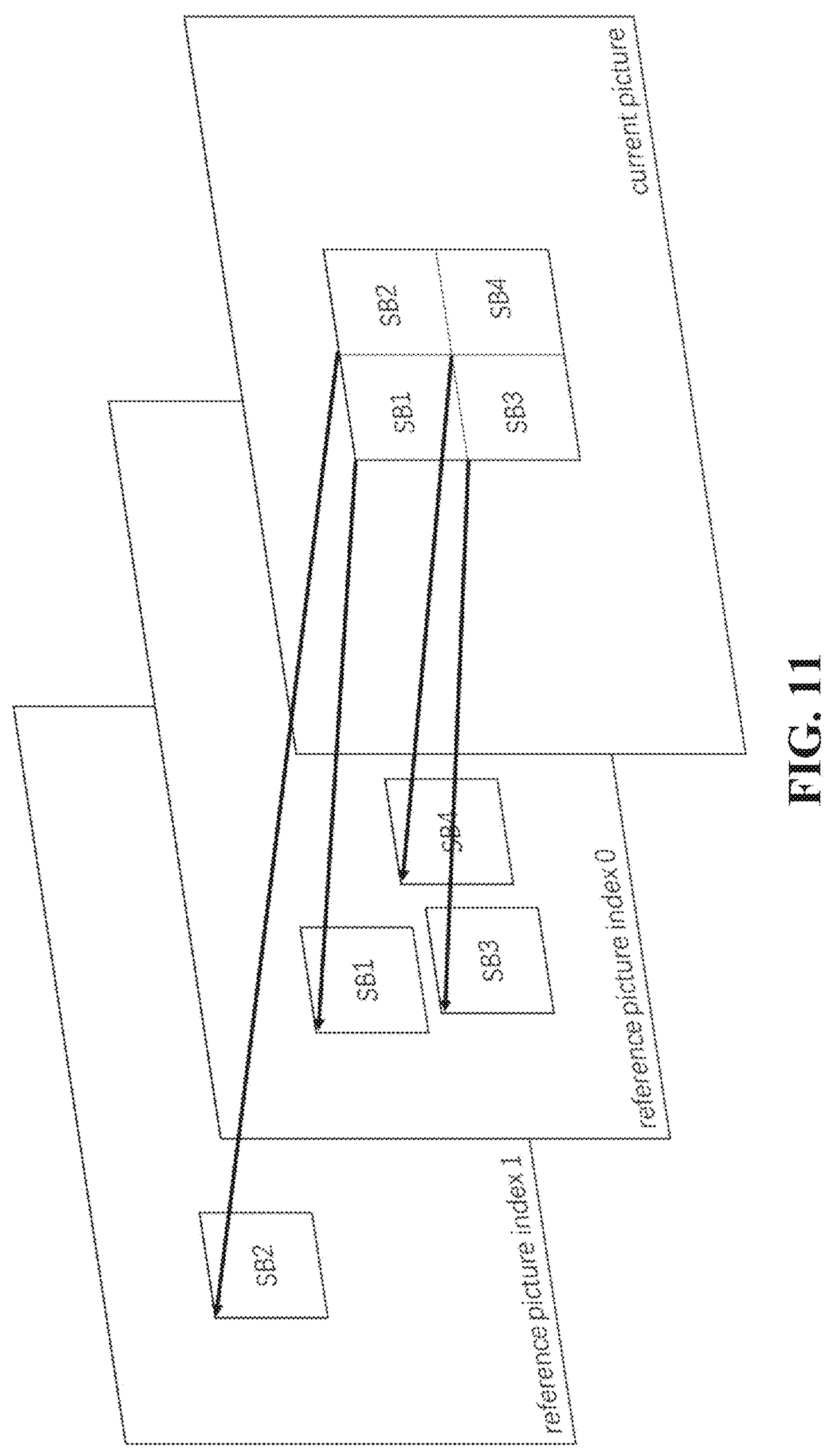
FIG. 11 illustrates an example of reference picture index selection for subblocks, according to some embodiments of the present disclosure.
Figure 12:
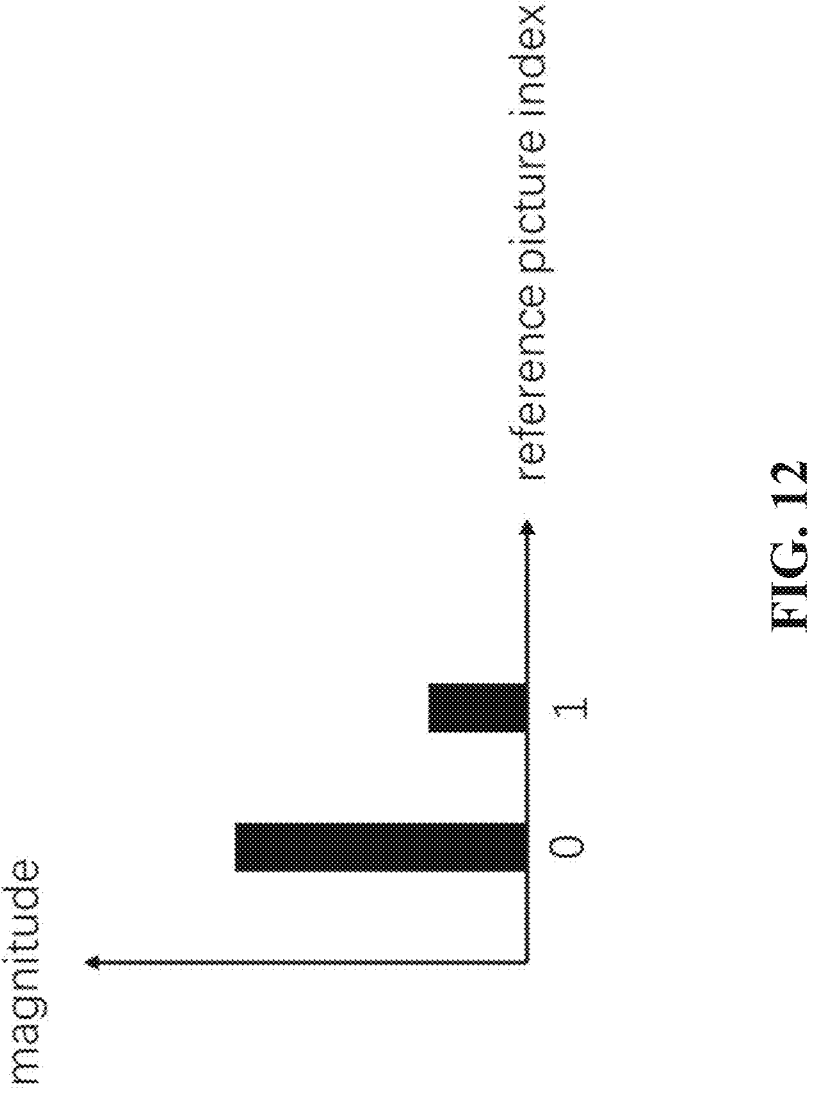
FIG. 12 illustrates an exemplary histogram for reference picture index, according to some embodiments of the present disclosure.
Figure 13:
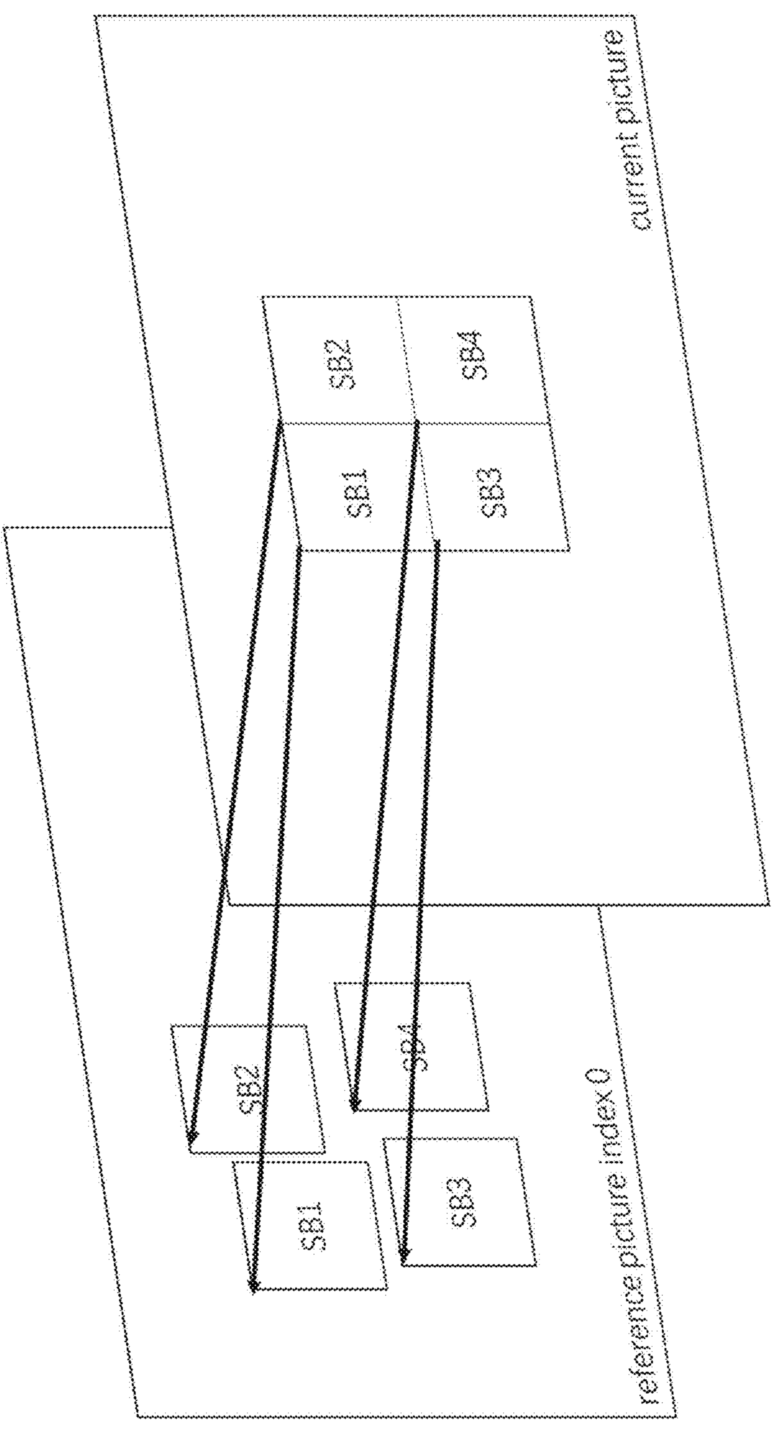
FIG. 13 illustrates an example of reference picture index for a SbTMVP coded coding unit (CU), according to some embodiments of the present disclosure.

In some embodiments, to allow flexibility for CU in a picture to select different reference picture, a histogram method is used to determine reference picture index for each CU. For each subblock, a reference picture index is first determined using the current ECM design. That is, scaling factor is calculated for each reference picture in a reference picture list, and the reference picture whose scaling factor is the closest to 1 is selected. A histogram is built using the selected reference picture indices of subblocks. Then, the reference picture index with highest magnitude is selected for all subblocks, and the temporal motion scaling is applied to scale all the temporal motion of subblocks to that reference picture index with highest magnitude. An example is shown in FIG. 11, in which each subblock has its own reference picture index determined according to scaling factor. In FIG. 12, a histogram is built. As can be seen, the reference picture index 0 has the highest magnitude. Then, in FIG. 13, this reference picture index 0 is selected and is used as reference picture for all subblocks.

Figure 14:
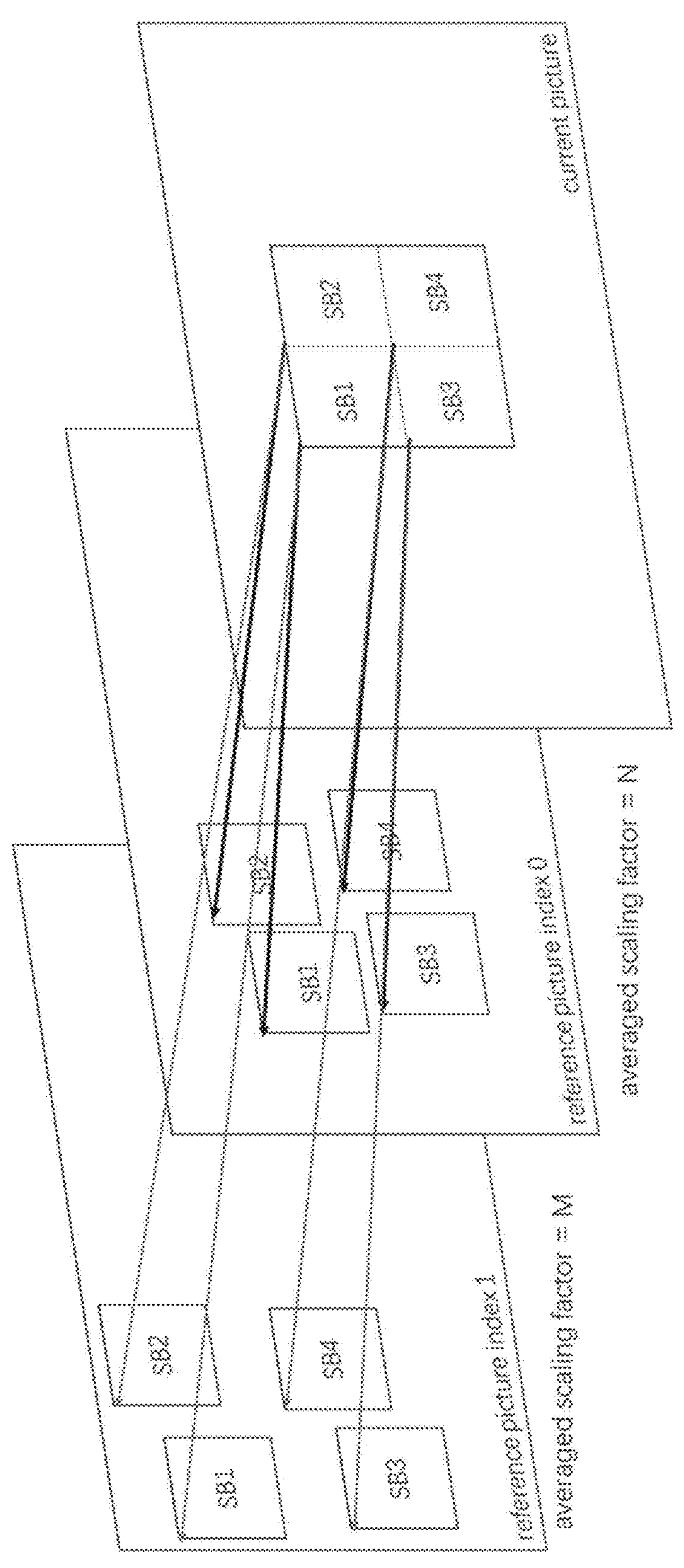
FIG. 14 illustrates an example of reference picture index selection for subblocks, according to some embodiments of the present disclosure.

In some embodiments, the averaged scaling factor of subblocks for each reference picture index is calculated. Then, the reference picture index whose averaged scaling factor is the closest to 1 is selected for all subblock. As illustrated in FIG. 14, the averaged scaling factor N and M for reference picture index 0 and 1 are calculated, respectively. If M is closer to 1 than N, the reference picture index 1 is selected for all subblocks. Otherwise, if N is closer to 1 than M, the reference picture index 0 is selected for all subblocks.

It is noted that the reference picture index for reference picture list L0 and L1 may be determined independently. That is, the determination process depicted in FIG. 11, FIG. 12, FIG. 13, and FIG. 14 are performed independently for the two reference picture lists L0 and L1.

In some embodiments, it is proposed to determine reference picture index for each CU based on a template matching cost. For each subblock, the template matching cost of the existing SbTMVP candidate is compared with the template matching cost of the SbTMVP candidates that restrict the reference picture indices for subblocks. Then, the reference picture index with the lower template matching cost is selected for all subblocks.

As an example, if the template matching cost of the existing SbTMVP candidate is greater than the template matching cost of the SbTMVP candidates that set the reference picture indices to 0, then the SbTMVP candidate that sets the reference picture indices to 0 is included in the subblock-based merge list.

As another example, if the template matching cost of the existing SbTMVP candidate is equal to the template matching cost of the SbTMVP candidates that set the reference picture indices to 0, then the existing SbTMVP candidate is included in the subblock-based merge list.

In some embodiments, it is proposed to include multiple SbTMVP candidates with different methods to determine reference picture indices for subblocks to subblock-based merge list. Specifically, in addition to the SbTMVP candidates which allow different reference picture indices for subblocks (i.e., current SbTMVP candidate in ECM), the SbTMVP candidates which restrict the reference picture indices for subblocks to be the same are also included to subblock-based merge list. The ARMC may be applied to sort these new added SbTMVP candidates. The number of candidates in subblock-based merge list before ARMC may be increased from 30 to a larger number. The number of candidates in subblock-based merge list after ARMC may also be increased from 15 to a larger number.

In some embodiments, the subblock-based merge list can include one or more SbTMVP candidates that have a reference picture index set to a fixed value (e.g., 0). As an example, in addition to the SbTMVP candidates which allow different reference picture indices for subblock, one or more SbTMVP candidates whose reference picture indices are set (i.e., fixed) to 0 is included in the subblock-based merge list. The ARMC can be applied to sort all SbTMVP candidates with affine merge candidates in the subblock-based merge list. The number of candidates in subblock-based merge list before and after ARMC are kept unchanged.

As another example, in addition to the SbTMVP candidates which allow different reference picture indices for subblock, the SbTMVP candidates whose reference picture indices are set (i.e., fixed) to 0 is included in the subblock-based merge list. The ARMC is applied to sort all SbTMVP candidates except the first SbTMVP candidate with affine merge candidates in the subblock-based merge list.

As another example, in addition to the SbTMVP candidates that allow different reference picture indices for subblock, the first two or three SbTMVP candidates whose reference picture indices are set (i.e., fixed) to 0 are included in the subblock-based merge list. The ARMC is applied to sort all SbTMVP candidates with affine merge candidates in the subblock-based merge list. The number of candidates in subblock-based merge list before and after the ARMC are kept unchanged.

As another example, in addition to the SbTMVP candidates that allow different reference picture indices for subblock, the first two or three SbTMVP candidates whose reference picture indices are set (i.e., fixed) to 0 are included in the subblock-based merge list. The ARMC is applied to sort all SbTMVP candidates except the first SbTMVP candidate with affine merge candidates in the subblock-based merge list.

As another example, the SbTMVP candidates that always set reference picture indices to 0 are included in the subblock-based merge list. Only the first two or three SbTMVP candidates that allow different reference picture indices for subblock are included; the other SbTMVP candidates are excluded. The ARMC is applied to sort all SbTMVP candidates with affine merge candidates in the subblock-based merge list. The number of candidates in subblock-based merge list before and after the ARMC are kept unchanged.

As another example, the SbTMVP candidates that always set reference picture indices to 0 are included in the subblock-based merge list. Only the first two or three SbTMVP candidates that allow different reference picture indices for subblock are included; the others are excluded. The ARMC is applied to sort all SbTMVP candidates except the first SbTMVP candidate with affine merge candidates in the subblock-based merge list.

As another example, the SbTMVP candidates, which are used for determining reference picture indices for subblocks using histogram method or used for calculating the averaged scaling factor, are included to the subblock-based merge list. The ARMC is applied to sort all SbTMVP candidates with affine merge candidates. The number of candidates in subblock-based merge list before ARMC is increased to a number larger than 30 (e.g., 38). The number of candidates in subblock-based merge list after ARMC is kept unchanged.

It is noted that when sorting all SbTMVP candidates including the first SbTMVP candidate in the subblock-based merge list using ARMC, the TM cost of the first SbTMVP may multiply a number smaller than 1 (e.g., 0.9) to give slightly advantage to the first SbTMVP candidate.

In some embodiments, when including the additional SbTMVP candidates, which restrict the reference picture indices for subblocks to be the same, to the subblock-based merge list, these additional candidates may be inserted before or after the existing SbTMVP candidates, which allow different reference picture indices for subblocks.

In one example, the additional SbTMVP candidates are inserted right after the existing SbTMVP candidates for each motion shift candidate. More specifically, the existing and additional SbTMVP candidates are added to the subblock-based merge list as follows:

- the existing and the additional SbTMVP candidates derived from the first candidate in the first motion shift candidate list are placed in the first and second entries, respectively;
- if current picture is a non-low delay picture and the two collocated pictures are different from each other, the existing and the additional SbTMVP candidates derived from the first candidate in the second motion shift candidate list are added;
- the existing and the additional SbTMVP candidates derived from the second candidate in the first motion shift candidate list are added;
- the existing and the additional SbTMVP candidates derived from the third candidate in the first motion shift candidate list are added.

As another example, the additional SbTMVP candidates are inserted right before the existing SbTMVP candidates for each motion shift candidate. Specifically, the existing and additional SbTMVP candidates are added to the subblock-based merge list as follows:

- the additional and the existing SbTMVP candidates derived from the first candidate in the first motion shift candidate list are placed in the first and second entries, respectively;
- if current picture is a non-low delay picture and the two collocated pictures are different from each other, the additional and the existing SbTMVP candidates derived from the first candidate in the second motion shift candidate list are added;

the additional and the existing SbTMVP candidates derived from the second candidate in the first motion shift candidate list are added;

the additional and the existing SbTMVP candidates derived from the third candidate in the first motion shift candidate list are added.

As another example, the additional SbTMVP candidates are inserted after all the existing SbTMVP candidates. The existing and additional SbTMVP candidates are added to the subblock-based merge list as follows:

the existing SbTMVP candidate derived from the first candidate in the first motion shift candidate list is placed in the first entry;

if current picture is a non-low delay picture and the two collocated pictures are different from each other, the existing SbTMVP candidate derived from the first candidate in the second motion shift candidate list is added;

the existing SbTMVP candidates derived from the second and third candidates in the first motion shift candidate list are added;

the additional SbTMVP candidate derived from the first candidate in the first motion shift candidate list is added;

if current picture is a non-low delay picture and the two collocated pictures are different from each other, the additional SbTMVP candidate derived from the first candidate in the second motion shift candidate list is added;

the additional SbTMVP candidates derived from the second and third candidates in the first motion shift candidate list are added.

In this disclosure, it is proposed to eliminate redundancy of the SbTMVP candidates. In the above-described embodiments, some additional SbTMVP candidates are newly added to enhance the motion vector prediction process. Building upon this, eliminating redundancy ensures that only unique and necessary candidates are retained, thereby optimizing the predictive process and enhancing coding efficiency.

In some embodiments, it is proposed to focus on removing newly added candidates that are similar to certain specific existing candidates. The ARMC may be applied to sort the SbTMVP candidates after eliminating their redundancy. The number of the candidates in the subblock-based merge list before and after the ARMC may be kept unchanged.

As an example, if the reference picture index of the center and the first subblock of the additional SbTMVP candidates are identical to those of a specific existing SbTMVP candidate, the additional SbTMVP candidates will not be added.

As an example, if the motion vector and the reference picture index of the center and the first subblock of the additional SbTMVP candidates are identical to those of a specific existing SbTMVP candidate, the additional SbTMVP candidates will not be added.

As an example, if the reference picture index and motion vector for all subblocks of the additional SbTMVP candidates are identical to those of a specific existing SbTMVP candidate, the additional SbTMVP candidates will not be added.

As an example, if the maximum or averaged value of the difference of motion vectors for all subblocks between the additional SbTMVP candidate and a specific existing SbTMVP candidate is less than a predetermined threshold and the reference picture indices for all subblocks are identical, the additional SbTMVP candidates will not be added.

In some embodiments, it is proposed to focus on removing newly added candidates that are similar to any of the existing candidates. The number of candidates in the subblock-based merge list before the ARMC and after the ARMC may be kept unchanged.

As an example, if the reference picture index of the center and the first subblock of the additional SbTMVP candidates are identical to those of any of the existing SbTMVP candidate, the additional SbTMVP candidates will not be added.

As an example, if the motion vector and the reference picture index of the center and the first subblock of the additional SbTMVP candidates are identical to those of any of the existing SbTMVP candidate, the additional SbTMVP candidates will not be added.

As an example, if the reference picture index and motion vector for all subblocks of the additional SbTMVP candidates are identical to those of any of the existing SbTMVP candidate, the additional SbTMVP candidates will not be added.

As an example, if the maximum or averaged value of the difference of motion vectors for all subblocks between the additional SbTMVP candidate and any of the existing SbTMVP candidates is less than a predetermined threshold and the reference picture indices for all subblocks are identical, the additional SbTMVP candidates will not be added.

In some embodiments, it is proposed to remove redundant SbTMVP candidates in the subblock-based merge list, not just among the new additional SbTMVP candidates. The number of candidates in the subblock-based merge list before the ARMC may be 30. The number of candidates in the subblock-based merge list after the ARMC may be 15.

As an example, if the reference picture index of the center and the first subblock of a new SbTMVP candidate are identical to that of another SbTMVP candidate within the subblock-based merge list, the new SbTMVP candidate will not be added.

As an example, if the motion vector and the reference picture index of the center and the first subblock of a new SbTMVP candidate are identical to those of another SbTMVP candidate within the subblock-based merge list, the new SbTMVP candidate will not be added.

As an example, if the reference picture index and motion vector for all subblocks of a new SbTMVP candidate are identical to those of another SbTMVP candidate within the subblock-based merge list, the new SbTMVP candidate will not be added.

As an example, if the maximum or averaged value of the differences of the motion vectors for all subblocks between a new SbTMVP candidate and another SbTMVP candidate within the subblock-based merge list is less than a predetermined threshold and the reference picture index for all subblocks are identical, the new SbTMVP candidate will not be added.

In some embodiments, it is proposed to eliminate redundancy among SbTMVP candidates based on the template matching cost. Specifically, it is proposed to sort the SbTMVP candidates based on the template matching cost and select the top-k candidates with the least costs for inclusion in the subblock-based merge list. This method may be combined with the any other disclosed methods for eliminating redundancy of the SbTMVP candidates.

As an example, it is proposed to sort the remaining SbTMVP candidates based on the template matching cost and select up to four candidates with the least cost to include in the subblock-based merge list.

As an example, after removing all redundant SbTMVP candidates whose reference picture indices and motion vectors for all subblocks are identical to another SbTMVP, it is proposed to sort the remaining SbTMVP candidates based on the template matching cost and select up to four candidates with the least costs to include in the subblock-based merge list.

Figure 15:
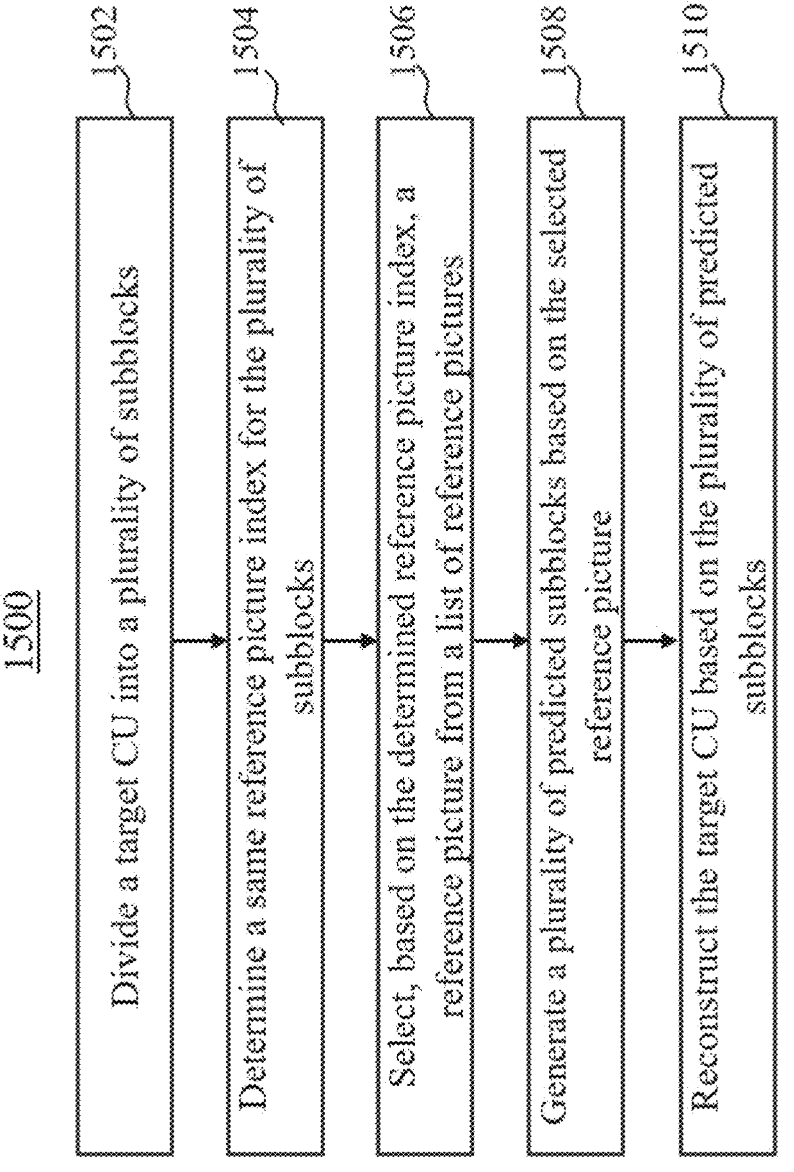
FIG. 15 is a flow chart showing an exemplary video encoding method corresponding to the decoding method in FIG. 10, according to some embodiments of the present disclosure.

FIG. 15 is a flow chart showing an exemplary method 1500 for encoding a video sequence in the SbTMVP mode, according to some embodiments of the present disclosure. Encoding method 1500 corresponds to the decoding method 1000 in FIG. 10. Method 1500 can be performed by an encoder (e.g., by process 200A of FIG. 2A or 200B of FIG. 2B), or performed by one or more software or hardware components of an apparatus (e.g., apparatus 400 of FIG. 4). For example, a processor (e.g., processor 402 of FIG. 4) can perform method 1500. In some embodiments, method 1500 can be implemented by a computer program product, embodied in a computer-readable medium, including computer-executable instructions, such as program code, executed by computers (e.g., apparatus 400 of FIG. 4). Referring to FIG. 15, method 1500 may include the following steps 1502 to 1510.

In step 1502, a target CU is divided into a plurality of subblocks for encoding according to the SbTMVP mode.

In step 1504, a same reference picture index is determined for the plurality of subblocks.

In step 1506, a reference picture is selected from a list of reference picture list according to the determined reference picture index.

In step 1508, a plurality of predicted subblocks is generated based on the selected reference picture.

In step 1510, the target CU is reconstructed based on the plurality of predicted subblocks. The reconstructed CU can be used to encoding a next CU or a next picture, as described in process 200A of FIG. 2A or 200B of FIG. 2B.

The present disclosure also provides methods to modify the prediction direction of SbTMVP mode.

In ECM-10.0 design, the prediction direction of subblocks in a SbTMVP coded block may be different from each other. As shown in FIG. 6, the prediction direction of subblock can be either L0-predictive, L1-predictive, or bi-predictive.

Figure 16:
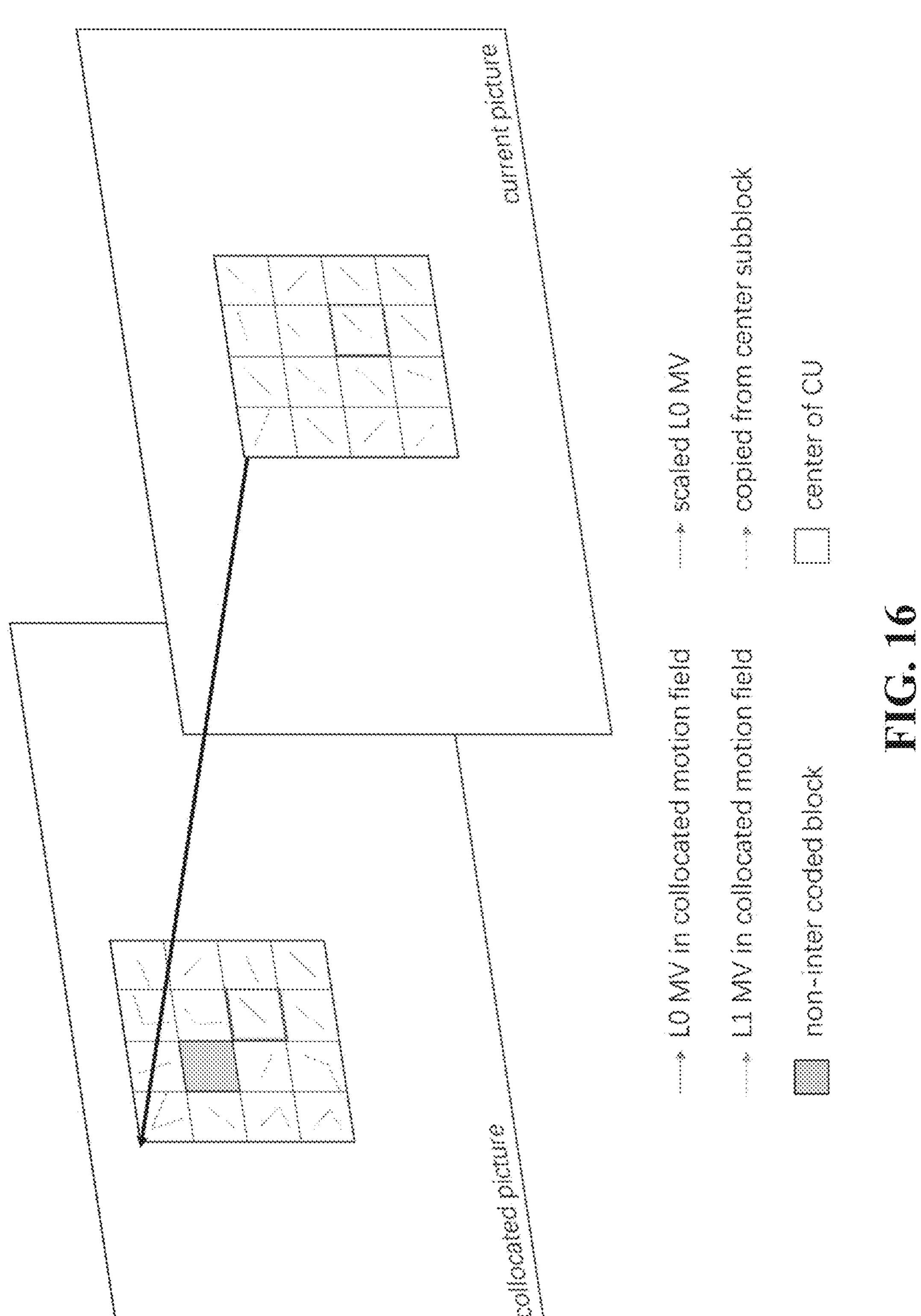
FIG. 16 illustrates an example of restrict prediction directions of subblocks to be L0-predictive, according to some embodiments of the present disclosure.

To reduce the discontinuity between subblocks, in one embodiment, it is proposed to restrict the prediction direction of all subblocks to be the same. The prediction direction is set according to that of center subblock. If the prediction direction of center subblock is bi-predictive, the prediction directions of all subblocks are set to be bi-predictive. In case that the corresponding temporal subblocks is L0- or L1-predictive, the motion vector of the center subblock is used instead. If the prediction direction of center subblock is L0-predictive, the prediction directions of all subblocks are set to L0-predictive. Similarly, if the prediction direction of center subblock is L1-predictive, the prediction directions of all subblocks are set to L1-predictive. An example is shown in FIG. 16.

In some embodiments, it is proposed to include multiple SbTMVP candidates with different prediction direction settings to the subblock-based merge list. More specific, in addition to the SbTMVP candidates which allow adaptive prediction direction for subblocks, three SbTMVP candidates which restrict prediction direction of subblocks to be L0-, L1- and bi-predictive are added to the subblock-based merge list. The ARMC may be applied to sort these new added SbTMVP candidates. The number of candidates in subblock-based merge list before ARMC may be increased from 30 to a larger number. The number of candidates in subblock-based merge list after ARMC may also be increased from 15 to a larger number.

Figure 17:
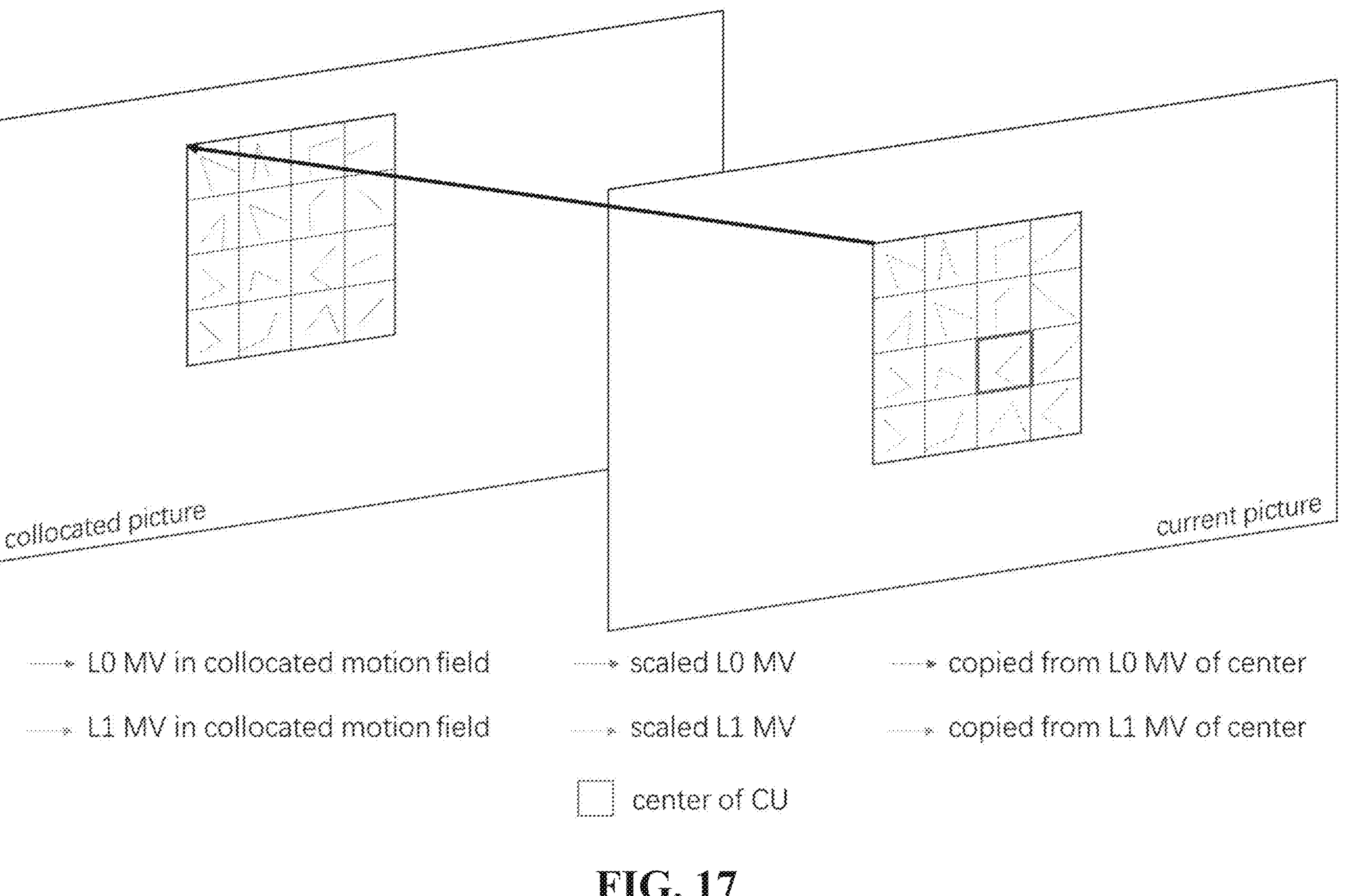
FIG. 17 illustrates exemplary restrict prediction directions of subblocks, according to some embodiments of the present disclosure.

In some embodiments, it is proposed to select the most frequent prediction direction among subblocks as prediction selection for all subblocks. A histogram is built using the prediction direction of subblocks, and then the one with highest magnitude is selected. An example is shown in FIG. 17, 12 out of 16 subblocks use bi-predictive motion. Thus, the prediction directions of all the subblocks are restricted to be bi-predictive.

In some embodiments, it is proposed to signal the prediction direction of SbTMVP at SPS, PPS, picture header, slice header.

According to the disclosed embodiments, local illumination compensation (LIC) can be applied to the SbTMVP mode to compensate the illumination changes between reference picture and current picture.

Figure 18:
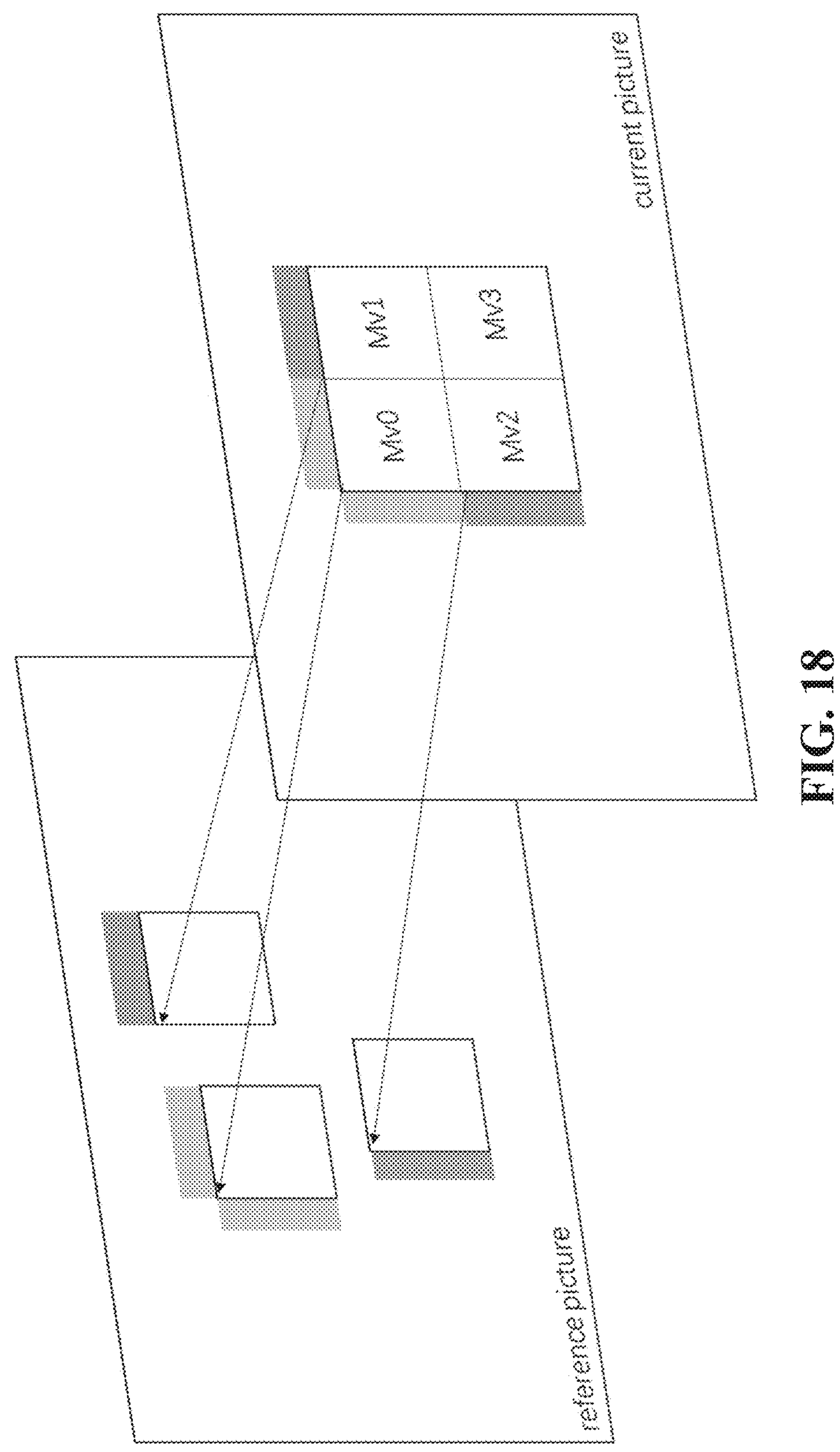
FIG. 18 illustrates an exemplary local illumination compensation (LIC) process, according to some embodiments of the present disclosure.

In some embodiments, the LIC is applied to the whole CU. The reference template is generated using the motion information of subblocks located at CU boundary. In order to avoid using different reference pictures to construct the reference template, it is proposed to restrict the reference picture indices and prediction direction of all subblocks to be the same. As shown in FIG. 18, the gray template is generated using the motion information of top-left subblock (Mv0), the green template is generated using the motion information of top-right subblock (Mv1), and the orange template is generated using the motion information of bottom-left subblock (Mv2). After the reference template is generated, the LIC parameters are derived using the neighboring reconstructed template and the reference template using the same LIC process as that in ECM. Then, the derived LIC parameters is applied to the prediction samples within the CU. Same as ECM design, the derived LIC parameters will be inherited to neighboring blocks in OBMC process.

Figure 19:
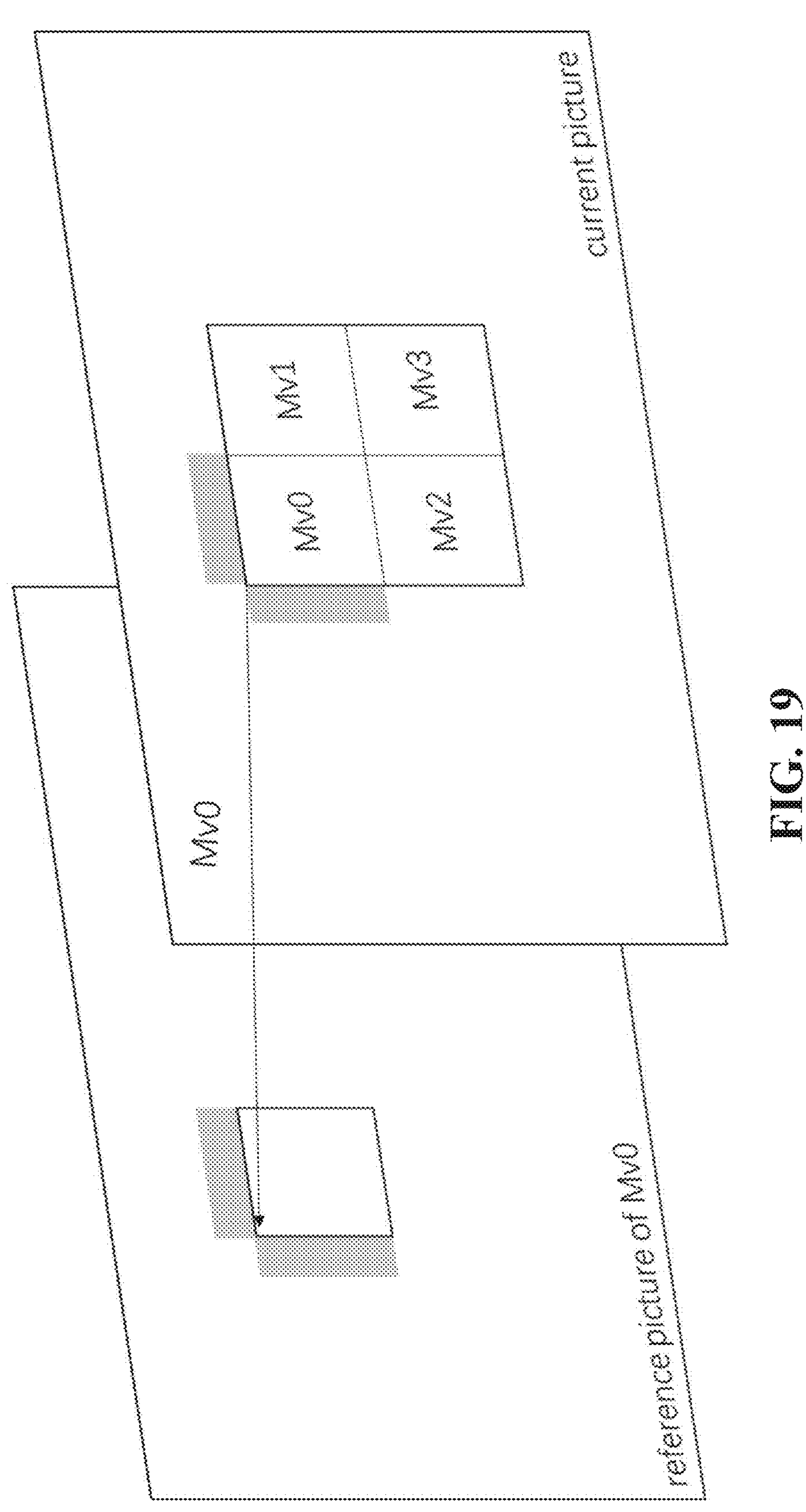
FIG. 19 illustrates an exemplary LIC parameter derivation process for a subblock located at a top-left position, according to some embodiments of the present disclosure.
Figure 20:
FIG. 20 illustrates an exemplary LIC parameter derivation process for a subblock located at a top-right position, according to some embodiments of the present disclosure.
Figure 21:
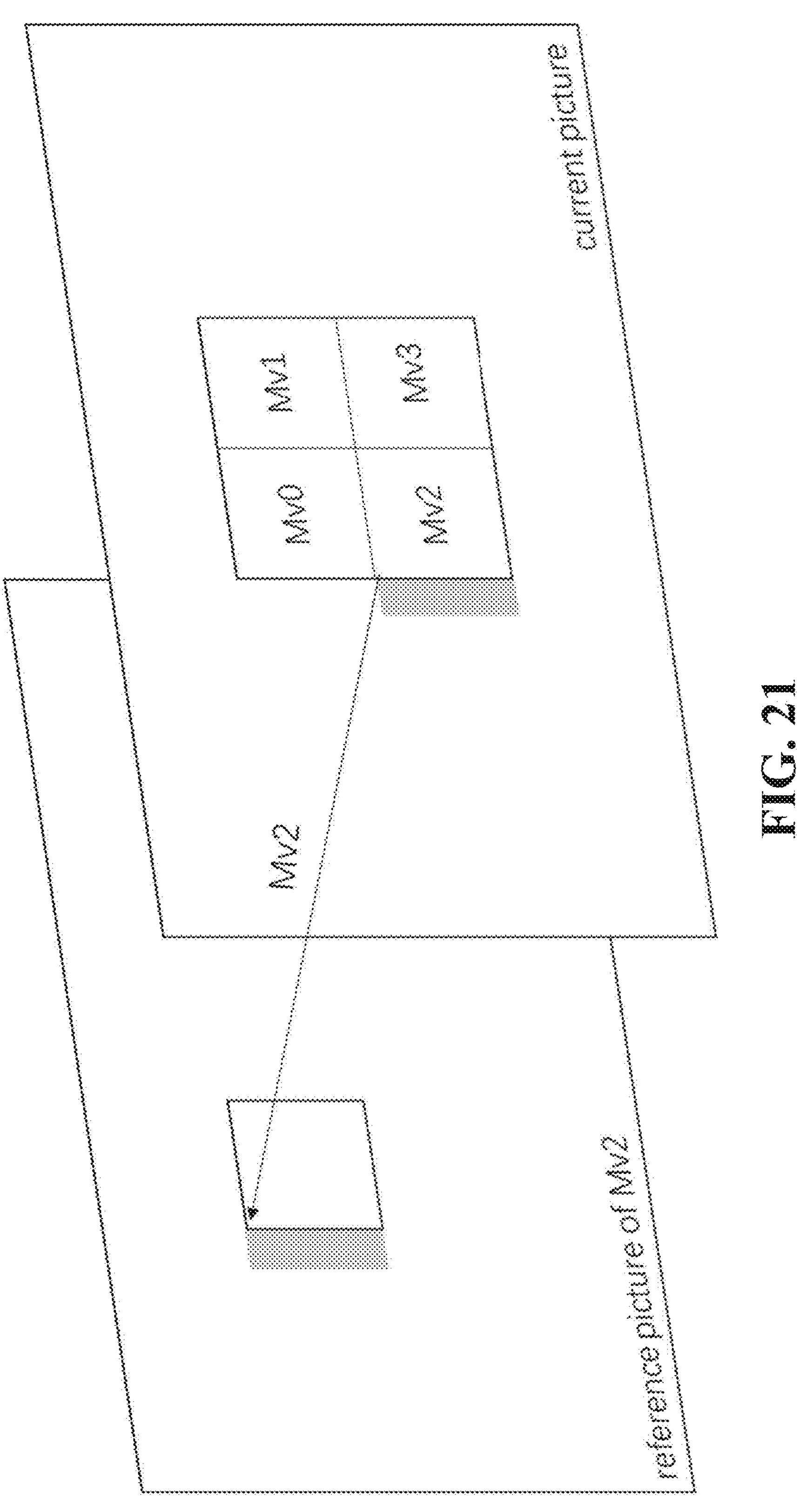
FIG. 21 illustrates an exemplary LIC parameter derivation process for a subblock located at a bottom-left position, according to some embodiments of the present disclosure.

In some embodiments, instead of restricting the motion information of subblocks, it is proposed to apply LIC only to the subblocks located at CU boundary. For each subblock located at CU boundary, the reference template is generated using its own motion information, and the LIC parameters are derived using the reference template and the corresponding neighboring reconstructed template. The derived LIC parameters are only applied to that subblock. Examples are shown in FIG. 19, FIG. 20, and FIG. 21. As shown in FIG. 19, for the top-left subblock, the top and left reconstructed samples (show as the shaded areas) are used to derive LIC parameters. As shown in FIG. 20, for the top-right subblock, only the top reconstructed samples (show as the shaded areas) are used since the left neighboring samples of the top-right subblock are not constructed yet. Similarly, as shown in FIG. 21, for the bottom-left subblock, only the left reconstructed samples (show as the shaded areas) are used since the top neighboring samples of the bottom-left subblock are not constructed yet. For the bottom-right subblock, the LIC is not applied.

Figure 22:
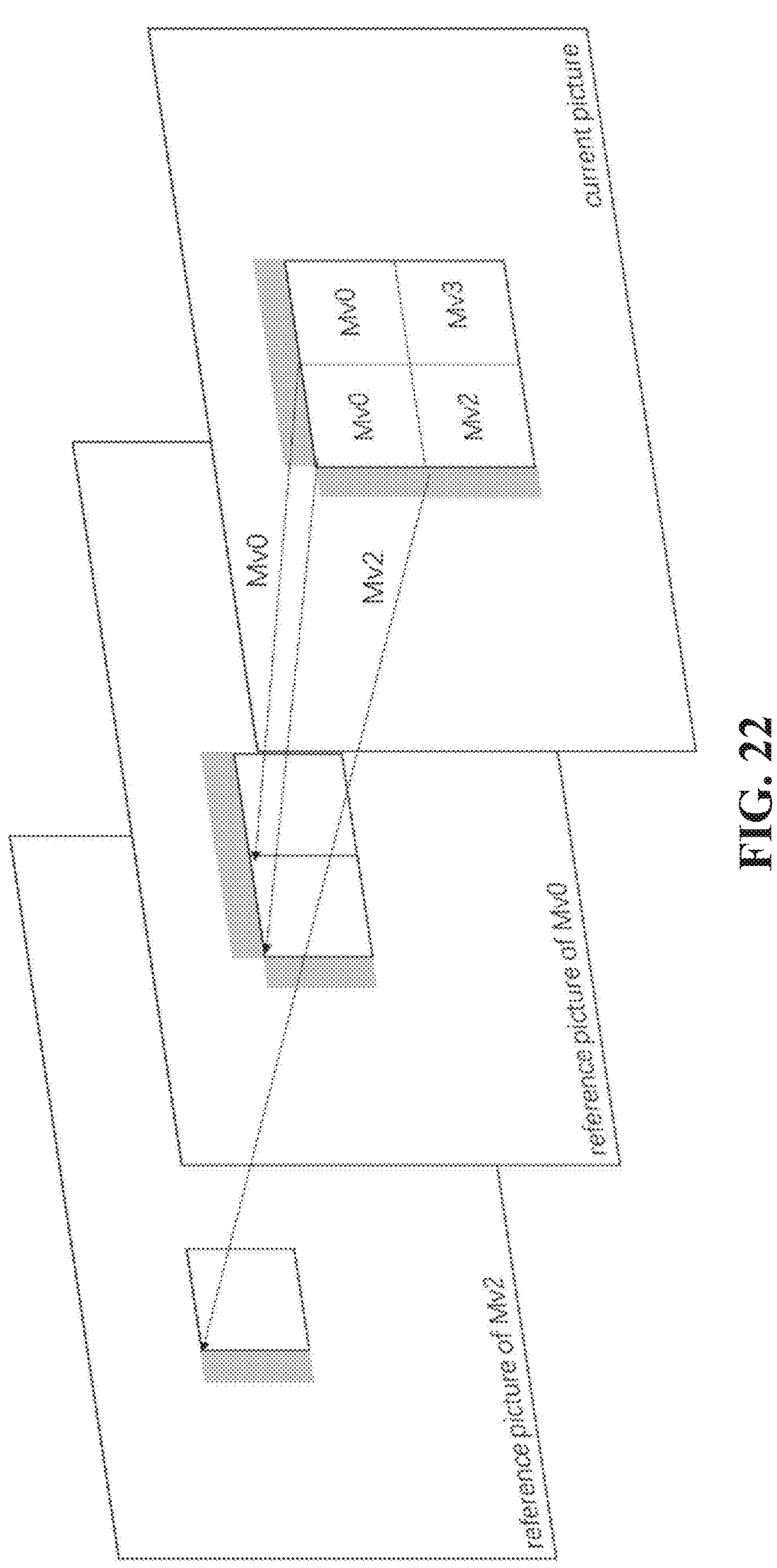
FIG. 22 illustrates examples of storing LIC parameters, according to some embodiments of the present disclosure.

When OBMC is applied to the SbTMVP and LIC coded block, the LIC parameters may applied to generate the corresponding prediction samples for the OBMC of the LIC coded block. In one example, the LIC parameters are stored at subblock level, and these subblock level LIC parameters are used to generate the corresponding prediction samples. In another example, the LIC parameters are stored at CU level, and these CU level LIC parameters are used to generate the corresponding prediction samples. Since in this embodiment, the LIC parameters of subblocks may be different from each other, the LIC parameters stored at CU level can be one of LIC parameters of a subblock within CU. The stored LIC parameters can be the one used for top-left subblock. The stored LIC parameter can be the one used in most of subblocks, as shown in FIG. 22, the LIC parameters derived using Mv0 is used for two subblocks, and is stored at CU level for OBMC process.

To determine whether the LIC is enabled or disabled for a SbTMVP coded block, in some embodiments, it is proposed to inherit the LIC flag from the neighboring spatial block which is used to derive the motion shift.

In some embodiments, the LIC flag is inherited from the temporal collocated block of the center subblock.

In some embodiments, the LIC flag is signaled in the bitstream if the subblock-based merge mode is used.

In some embodiments, the SbTMVP candidates with LIC enabled and with LIC disabled are both included to the subblock-based merge list.

The embodiments described in the present disclosure can be freely combined.

The embodiments may further be described using the following clauses:

1. A computer-implemented method of decoding a bitstream associated with a video sequence, the method comprising:

decoding a candidate index associated with a candidate list for a target coding unit (CU), wherein the candidate list comprises a first candidate and a second candidate, the first and second candidates being coded using a subblock-based temporal motion vector prediction (SbTMVP) mode, and the target CU being divided into a plurality of subblocks;

selecting, based on the candidate index, one of the first and the second candidates to decode the target CU;

generating a plurality of predicted subblocks based on the selected candidate; and reconstructing the target CU based on the plurality of predicted subblocks, wherein the generating of the plurality of predicted subblocks comprises:

in response to the first candidate being selected, determining a same reference picture index for the plurality of subblocks, selecting, based on the determined same reference picture index, a reference picture from a list of reference pictures, and generating the plurality of predicted subblocks based on the selected reference picture; or in response to the second candidate being selected, determining different reference picture indices for at least two subblocks in the plurality of subblocks, selecting, based on the determined different reference picture indices, at least two reference pictures from the list of reference pictures, and generating the plurality of predicted subblocks based on the selected at least two reference pictures.

2. The method according to clause 1, wherein determining the same reference picture index for the plurality of subblocks comprises:

setting the same reference picture index to be 0.

3. The method according to clause 1, wherein determining the same reference picture index for the plurality of subblocks comprises:

determining the same reference picture index based on a flag signaled in the bitstream.

4. The method according to clause 3, wherein the flag is signaled in at least one of a sequence parameter set (SPS), a picture parameter set (PPS), a picture header, or a slice header.

5. The method according to clause 1, wherein:

the list of reference pictures comprises a first list of reference pictures and a second list of reference pictures;

the determined same reference picture index comprises a first index associated with the first list of reference pictures and a second index associated with the second list of reference pictures;

the selected reference picture comprises: a first reference picture selected from the first list of reference pictures based on the first index, and a second reference picture selected from the second list of reference pictures based on the second index; and generating the plurality of predicted subblocks based on the selected reference picture comprises:

generating the plurality of predicted subblocks based on the first and second reference pictures.

6. The method according to clause 1, wherein determining the same reference picture index for the plurality of subblocks comprises:

determining a plurality of reference picture indices associated with the plurality of subblocks, respectively;

determining a parameter associated with the plurality of reference picture indices; and selecting, based on the parameter, the same reference picture index from the plurality of reference picture indices.

7. The method according to clause 6, wherein the parameter comprises at least one of a scaling factor or a template matching cost.

8. The method according to clause 1, wherein the candidate list comprises one or more candidates that have a reference picture index set to a fixed value.

9. The method according to clause 8, wherein the fixed value is 0.

10. The method according to clause 8, wherein the candidate list further comprises one or more candidates that have reference picture indices different from the fixed value.

11. The method according to clause 8, wherein the candidate list is part of a merge list that comprises one or more affine merge candidates, and the method further comprises:

sorting the candidates for the SbTMVP and the affine merge candidates in the merge list, wherein the sorting uses adaptive reordering of merge candidates with template matching (ARMC).

12. A computer-implemented method of encoding a video sequence, the method comprising:

dividing a target coding unit (CU) into a plurality of target subblocks; and encoding a candidate index associated with a candidate list for a target coding unit (CU), wherein the candidate list comprises a first candidate and a second candidate, the first and second candidates being coded using a subblock-based temporal motion vector prediction (SbTMVP) mode;

selecting, based on the candidate index, one of the first and the second candidates to encode the target CU;

generating a plurality of predicted subblocks based on the selected candidate and the plurality of target subblocks; and reconstructing the target CU based on the plurality of predicted subblocks, wherein the generating of the plurality of predicted subblocks comprises:

in response to the first candidate being selected, determining a same reference picture index for the plurality of subblocks, selecting, based on the determined same reference picture index, a reference picture from a list of reference pictures, and generating the plurality of predicted subblocks based on the selected reference picture; or in response to the second candidate being selected, determining different reference picture indices for at least two subblocks in the plurality of subblocks, selecting, based on the determined different reference picture indices, at least two reference pictures from the list of reference pictures, and generating the plurality of predicted subblocks based on the selected at least two reference pictures.

13. The method according to clause 12, wherein determining the same reference picture index for the plurality of subblocks comprises:

setting the same reference picture index to be 0.

14. The method according to clause 12, wherein determining the same reference picture index for the plurality of subblocks comprises:

encoding a flag indicating the same reference picture index.

15. The method according to clause 14, wherein the flag is encoded in at least one of a sequence parameter set (SPS), a picture parameter set (PPS), a picture header, or a slice header.

16. The method according to clause 12, wherein:

the list of reference pictures comprises a first list of reference pictures and a second list of reference pictures;

the determined same reference picture index comprises a first index associated with the first list of reference pictures and a second index associated with the second list of reference pictures;

the selected reference picture comprises: a first reference picture selected from the first list of reference pictures based on the first index, and a second reference picture selected from the second list of reference pictures based on the second index; and generating the plurality of predicted subblocks based on the selected reference picture comprises:

generating the plurality of predicted subblocks based on the first and second reference pictures.

17. The method according to clause 12, wherein determining the same reference picture index for the plurality of subblocks comprises:

determining a plurality of reference picture indices associated with the plurality of subblocks, respectively;

determining a parameter associated with the plurality of reference picture indices; and selecting, based on the parameter, the same reference picture index from the plurality of reference picture indices.

18. The method according to clause 17, wherein the parameter comprises at least one of a scaling factor or a template matching cost.

19. The method according to clause 12, wherein the candidate list comprises one or more candidates that have a reference picture index set to a fixed value.

20. The method according to clause 19, wherein the fixed value is 0.

21. The method according to clause 19, wherein the candidate list further comprises one or more candidates that have reference picture indices different from the fixed value.

22. The method according to clause 19, wherein the candidate list is part of a merge list that comprises one or more affine merge candidates, and the method further comprises:

sorting the candidates for the SbTMVP and the affine merge candidates in the merge list, wherein the sorting uses adaptive reordering of merge candidates with template matching (ARMC).

23. A non-transitory computer readable storage medium storing a bitstream of a video, wherein the bitstream comprises:

syntax elements comprising a candidate index associated with a candidate list for a target coding unit (CU), wherein the candidate list comprises a first candidate and a second candidate, the first and second candidates being coded using a subblock-based temporal motion vector prediction (SbTMVP) mode, and the target CU being divided into a plurality of subblocks, wherein the syntax elements, when decoded by a processor, cause the processor to process the bitstream according to:

selecting, based on the candidate index, one of the first and the second candidates to decode the target CU;

generating a plurality of predicted subblocks based on the selected candidate; and reconstructing the target CU based on the plurality of predicted subblocks, wherein the generating of the plurality of predicted subblocks comprises:

in response to the first candidate being selected, determining a same reference picture index for the plurality of subblocks, selecting, based on the determined same reference picture index, a reference picture from a list of reference pictures, and generating the plurality of predicted subblocks based on the selected reference picture; or in response to the second candidate being selected, determining different reference picture indices for at least two subblocks in the plurality of subblocks, selecting, based on the determined different reference picture indices, at least two reference pictures from the list of reference pictures, and generating the plurality of predicted subblocks based on the selected at least two reference pictures.

24. The non-transitory computer readable storage medium according to clause 23, wherein determining the same reference picture index for the plurality of subblocks comprises:

setting the same reference picture index to be 0.

25. The non-transitory computer readable storage medium according to clause 23, wherein determining the same reference picture index for the plurality of subblocks comprises:

determining the same reference picture index based on a flag signaled in the bitstream.

26. The non-transitory computer readable storage medium according to clause 25, wherein the flag is comprised in at least one of a sequence parameter set (SPS), a picture parameter set (PPS), a picture header, or a slice header.

27. The non-transitory computer readable storage medium according to clause 23, wherein:

the list of reference pictures comprises a first list of reference pictures and a second list of reference pictures;

the determined same reference picture index comprises a first index associated with the first list of reference pictures and a second index associated with the second list of reference pictures;

the selected reference picture comprises: a first reference picture selected from the first list of reference pictures based on the first index, and a second reference picture selected from the second list of reference pictures based on the second index; and generating the plurality of predicted subblocks based on the selected reference picture comprises:

generating the plurality of predicted subblocks based on the first and second reference pictures.

28. The non-transitory computer readable storage medium according to clause 23, wherein determining the same reference picture index for the plurality of subblocks comprises:

determining a plurality of reference picture indices associated with the plurality of subblocks, respectively;

determining a parameter associated with the plurality of reference picture indices; and selecting, based on the parameter, the same reference picture index from the plurality of reference picture indices.

29. The non-transitory computer readable storage medium according to clause 28, wherein the parameter comprises at least one of a scaling factor or a template matching cost.

30. The non-transitory computer readable storage medium according to clause 23, wherein the candidate list comprises one or more candidates that have a reference picture index set to a fixed value.

31. The non-transitory computer readable storage medium according to clause 30, wherein the fixed value is 0.

32. The non-transitory computer readable storage medium according to clause 30, wherein the candidate list further comprises one or more candidates that have reference picture indices different from the fixed value.

33. The non-transitory computer readable storage medium according to clause 30, wherein the candidate list is part of a merge list that comprises one or more affine merge candidates, and the syntax elements further cause the processor to process the bitstream according to:

sorting the candidates for the SbTMVP and the affine merge candidates in the merge list, wherein the sorting uses adaptive reordering of merge candidates with template matching (ARMC).

In some embodiments, a non-transitory computer-readable storage medium storing a bitstream is also provided. The bitstream can be encoded and decoded according to the disclosed subblock-based temporal motion vector prediction methods.

In some embodiments, a non-transitory computer-readable storage medium is also provided. In some embodiments, the medium can store all or portions of the video bitstream having one or more flags that indicate resampling applied, such as the temporal resampling and the spatial resampling. In some embodiments, the medium can store all or portions of the video bitstream having an index that indicates a resampling factor. In some embodiments, the medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method of decoding a bitstream associated with a video sequence, the method comprising:

decoding a candidate index associated with a candidate list for a target coding unit (CU), wherein the candidate list comprises a first candidate and a second candidate, the first and second candidates being coded using a subblock-based temporal motion vector prediction (SbTMVP) mode, and the target CU being divided into a plurality of subblocks;

selecting, based on the candidate index, one of the first and the second candidates to decode the target CU;

generating a plurality of predicted subblocks based on the selected candidate; and reconstructing the target CU based on the plurality of predicted subblocks, wherein the generating of the plurality of predicted subblocks comprises:

in response to the first candidate being selected, determining a same reference picture index for the plurality of subblocks, selecting, based on the determined same reference picture index, a reference picture from a list of reference pictures, and generating the plurality of predicted subblocks based on the selected reference picture; or in response to the second candidate being selected, determining different reference picture indices for at least two subblocks in the plurality of subblocks, selecting, based on the determined different reference picture indices, at least two reference pictures from the list of reference pictures, and generating the plurality of predicted subblocks based on the selected at least two reference pictures, wherein determining the same reference picture index for the plurality of subblocks comprises:

determining a plurality of reference picture indices associated with the plurality of subblocks, respectively;

determining a parameter associated with the plurality of reference picture indices; and selecting, based on the parameter, the same reference picture index from the plurality of reference picture indices, and wherein the parameter comprises at least one of a scaling factor or a template matching cost.

2. The method according to claim 1, wherein determining the same reference picture index for the plurality of subblocks comprises:

setting the same reference picture index to be 0.

3. The method according to claim 1, wherein determining the same reference picture index for the plurality of subblocks comprises:

determining the same reference picture index based on a flag signaled in the bitstream.

4. The method according to claim 3, wherein the flag is signaled in at least one of a sequence parameter set (SPS), a picture parameter set (PPS), a picture header, or a slice header.

5. The method according to claim 1, wherein:

the list of reference pictures comprises a first list of reference pictures and a second list of reference pictures;

the determined same reference picture index comprises a first index associated with the first list of reference pictures and a second index associated with the second list of reference pictures;

the selected reference picture comprises: a first reference picture selected from the first list of reference pictures based on the first index, and a second reference picture selected from the second list of reference pictures based on the second index; and generating the plurality of predicted subblocks based on the selected reference picture comprises:

generating the plurality of predicted subblocks based on the first and second reference pictures.

6. The method according to claim 1, wherein the candidate list comprises one or more candidates that have a reference picture index set to a fixed value.

7. The method according to claim 6, wherein the fixed value is 0.

8. The method according to claim 6, wherein the candidate list further comprises one or more candidates that have reference picture indices different from the fixed value.

9. The method according to claim 6, wherein the candidate list is part of a merge list that comprises one or more affine merge candidates, and the method further comprises:

sorting the candidates for the SbTMVP and the affine merge candidates in the merge list, wherein the sorting uses adaptive reordering of merge candidates with template matching (ARMC).

10. A computer-implemented method of encoding a video sequence, the method comprising:

dividing a target coding unit (CU) into a plurality of target subblocks; and encoding a candidate index associated with a candidate list for a target coding unit (CU), wherein the candidate list comprises a first candidate and a second candidate, the first and second candidates being coded using a subblock-based temporal motion vector prediction (SbTMVP) mode;

selecting, based on the candidate index, one of the first and the second candidates to encode the target CU;

generating a plurality of predicted subblocks based on the selected candidate and the plurality of target subblocks; and reconstructing the target CU based on the plurality of predicted subblocks, wherein the generating of the plurality of predicted subblocks comprises:

in response to the first candidate being selected, determining a same reference picture index for the plurality of subblocks, selecting, based on the determined same reference picture index, a reference picture from a list of reference pictures, and generating the plurality of predicted subblocks based on the selected reference picture; or in response to the second candidate being selected, determining different reference picture indices for at least two subblocks in the plurality of subblocks, selecting, based on the determined different reference picture indices, at least two reference pictures from the list of reference pictures, and generating the plurality of predicted subblocks based on the selected at least two reference pictures, wherein determining the same reference picture index for the plurality of subblocks comprises:

determining a plurality of reference picture indices associated with the plurality of subblocks, respectively;

determining a parameter associated with the plurality of reference picture indices; and selecting, based on the parameter, the same reference picture index from the plurality of reference picture indices, and wherein the parameter comprises at least one of a scaling factor or a template matching cost.

11. The method according to claim 10, wherein determining the same reference picture index for the plurality of subblocks comprises:

setting the same reference picture index to be 0.

12. The method according to claim 10, wherein determining the same reference picture index for the plurality of subblocks comprises:

encoding a flag indicating the same reference picture index.

13. The method according to claim 10, wherein:

the list of reference pictures comprises a first list of reference pictures and a second list of reference pictures;

the determined same reference picture index comprises a first index associated with the first list of reference pictures and a second index associated with the second list of reference pictures;

the selected reference picture comprises: a first reference picture selected from the first list of reference pictures based on the first index, and a second reference picture selected from the second list of reference pictures based on the second index; and generating the plurality of predicted subblocks based on the selected reference picture comprises:

generating the plurality of predicted subblocks based on the first and second reference pictures.

14. The method according to claim 10, wherein the candidate list comprises one or more candidates that have a reference picture index set to a fixed value.

15. The method according to claim 14, wherein the fixed value is 0.

16. The method according to claim 15, wherein the candidate list further comprises one or more candidates that have reference picture indices different from the fixed value.

17. A method for transmitting a bitstream of a video, the method comprising:

dividing a target coding unit (CU) into a plurality of target subblocks;

encoding a candidate index associated with a candidate list for a target CU, wherein the candidate list comprises a first candidate and a second candidate, the first and second candidates being coded using a subblock-based temporal motion vector prediction (SbTMVP) mode;

selecting, based on the candidate index, one of the first and the second candidates to encode the target CU;

generating a plurality of predicted subblocks based on the selected candidate and the plurality of target subblocks;

reconstructing the target CU based on the plurality of predicted subblocks; and transmitting a bitstream that is generated based on the reconstructing, wherein the generating of the plurality of predicted subblocks comprises:

in response to the first candidate being selected, determining a same reference picture index for the plurality of subblocks, selecting, based on the determined same reference picture index, a reference picture from a list of reference pictures, and generating the plurality of predicted subblocks based on the selected reference picture; or in response to the second candidate being selected, determining different reference picture indices for at least two subblocks in the plurality of subblocks, selecting, based on the determined different reference picture indices, at least two reference pictures from the list of reference pictures, and generating the plurality of predicted subblocks based on the selected at least two reference pictures, wherein determining the same reference picture index for the plurality of subblocks comprises:

determining a plurality of reference picture indices associated with the plurality of subblocks, respectively;

determining a parameter associated with the plurality of reference picture indices; and selecting, based on the parameter, the same reference picture index from the plurality of reference picture indices, and wherein the parameter comprises at least one of a scaling factor or a template matching cost.

18. The method according to claim 1, wherein the parameter comprises the scaling factor, and the method further comprises:

calculating an average scaling factor of subblocks for each of the plurality of reference picture indices; and selecting a reference picture index having an averaged scaling factor that is closest to 1 as the same reference picture index.

19. The method according to claim 1, wherein the parameter comprises the template matching cost, and the method further comprises:

comparing, for each of the plurality of subblocks, a template matching cost of an existing SbTMVP candidate with a template matching cost of SbTMVP candidates that restrict reference picture indices for the plurality of subblocks; and selecting a reference picture index with a lower template matching cost as the same reference picture index.

* * * * *